US008972996B2

(12) United States Patent
Matsubayashi et al.

(10) Patent No.: US 8,972,996 B2
(45) Date of Patent: Mar. 3, 2015

(54) INFORMATION PROCESSING APPARATUS, COMPUTER-READABLE MEDIUM STORING INFORMATION PROCESSING PROGRAM, AND INFORMATION PROCESSING METHOD

(75) Inventors: Hirokazu Matsubayashi, Kawasaki (JP); Shoji Oshima, Kawasaki (JP); Tatsuhiko Machida, Kawasaki (JP); Satoshi Yazawa, Kawasaki (JP); Kouichi Tsukada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 13/024,525

(22) Filed: Feb. 10, 2011

(65) Prior Publication Data

US 2011/0202923 A1  Aug. 18, 2011

(30) Foreign Application Priority Data

Feb. 17, 2010  (JP) ................................ 2010-032273

(51) Int. Cl.
*G06F 9/46* (2006.01)
*G06F 9/48* (2006.01)
*G06F 9/445* (2006.01)

(52) U.S. Cl.
CPC .............. *G06F 8/65* (2013.01); *G06F 9/4843* (2013.01)
USPC ....................................................... 718/100

(58) Field of Classification Search
CPC .................................................... G06F 9/4843
USPC ........................................................ 718/100
See application file for complete search history.

(56) References Cited

U.S. PATENT DOCUMENTS

| 6,427,227 B1 * | 7/2002 | Chamberlain ................ 717/124 |
| 2008/0020744 A1 * | 1/2008 | Duarte et al. ................. 455/418 |
| 2008/0027963 A1 | 1/2008 | Hiwatashi et al. |

FOREIGN PATENT DOCUMENTS

| JP | 1-259422 A | 10/1989 |
| JP | 3-008026 A | 1/1991 |
| JP | 2005-165528 A | 6/2005 |
| JP | 2006-99276 A | 4/2006 |
| JP | 2008-33827 A | 2/2008 |
| JP | 2008-186147 A | 8/2008 |
| JP | 2009-193218 A | 8/2009 |
| JP | 2009-265819 A | 11/2009 |

OTHER PUBLICATIONS

Japanese Office Action mailed Oct. 1, 2013 for corresponding Japanese Application No. 2010-032273, with Partial English-language Translation.

* cited by examiner

*Primary Examiner* — Camquy Truong
(74) *Attorney, Agent, or Firm* — Fujitsu Patent Center

(57) ABSTRACT

A processing function determination section included in an information processing apparatus determines a differential processing function which is a processing function that is realized by a first program and that is not realized by a second program. A control information determination section reads out relation information which associates a plurality of processing functions with one or more pieces of control information related to each of the plurality of processing functions from a storage section and determines a piece of control information related to the differential processing function on the basis of the relation information.

18 Claims, 29 Drawing Sheets

| EXAMPLE OF FUNCTION INFORMATION 442 | REPRESENTED BY HEXADECIMAL NOTATION | f | | | | c | | | | 0 | | | | 0 | | | |
|---|---|---|---|---|---|---|---|---|---|---|---|---|---|---|---|---|---|
| | BIT | 1 | 1 | 1 | 1 | 1 | 1 | 0 | 0 | 0 | 0 | 0 | 0 | 0 | 0 | 0 | 0 |
| | PROCESSING FUNCTION | A | B | C | D | E | F | G | H | I | J | K | L | M | N | O | P |

FIG. 10

450 SCREEN TABLE

| SCREEN IDENTIFICATION INFORMATION 451 | RELATED FUNCTION INFORMATION 452 |
|---|---|
| SIMPLIFIED DISPLAY SCREEN A | 0x2f01 |
| SIMPLIFIED DISPLAY SCREEN B | 0xf1e7 |
| SIMPLIFIED DISPLAY SCREEN C | 0x247c |
| SIMPLIFIED DISPLAY SCREEN D | 0x1203 |

FIG. 12

| | | | | | | | | | | | | | | | | |
|---|---|---|---|---|---|---|---|---|---|---|---|---|---|---|---|---|
| SIMPLIFIED DISPLAY SCREEN A | 0 | 0 | 1 | 0 | 1 | 1 | 0 | 1 | 0 | 0 | 0 | 0 | 0 | 0 | 0 | 1 |
| SIMPLIFIED DISPLAY SCREEN B | 1 | 1 | 1 | 0 | 0 | 1 | 1 | 0 | 0 | 0 | 0 | 0 | 0 | 1 | 1 | 1 |
| SIMPLIFIED DISPLAY SCREEN C | 0 | 0 | 0 | 0 | 0 | 1 | 0 | 0 | 1 | 1 | 1 | 1 | 1 | 1 | 0 | 0 |
| SIMPLIFIED DISPLAY SCREEN D | 0 | 0 | 1 | 0 | 0 | 0 | 0 | 1 | 0 | 0 | 0 | 0 | 0 | 1 | 0 | 1 |
| FUNCTION DIFFERENTIAL VALUE | 0 | 0 | 0 | 0 | 0 | 0 | 0 | 1 | 0 | 0 | 0 | 0 | 0 | 0 | 0 | 0 |
| PROCESSING FUNCTION | A | B | C | D | E | F | G | H | I | J | K | L | M | N | O | P |

FIG. 13

INFORMATION PROCESSING APPARATUS, COMPUTER-READABLE MEDIUM STORING INFORMATION PROCESSING PROGRAM, AND INFORMATION PROCESSING METHOD

CROSS-REFERENCE TO RELATED APPLICATION

This application is based upon and claims the benefit of priority of the prior Japanese Patent Application No. 2010-032273, filed on Feb. 17, 2010, the entire contents of which are incorporated herein by reference.

FIELD

The embodiments discussed herein are related to an information processing apparatus, a computer-readable medium storing an information processing program, and an information processing method.

BACKGROUND

Firmware installed into electronic devices may be updated in order to, for example, add a control function or correct a bug. With a controller for controlling a storage apparatus, for example, a difference in the version number of firmware may cause a difference in corresponding RAID (Redundant Arrays of Inexpensive Disks) level, the specifications of a storage apparatus which can be connected thereto, or the like.

In addition, there are systems which can update firmware installed into electronic devices under the control of an external device. For example, the following systems are known. That is to say, the version numbers of firmware applied to a plurality of terminal units are managed in block by a host apparatus. If the latest-version firmware is not applied to a terminal unit, then correction data for updating the firmware is sent from the host apparatus to the terminal unit.

The following technique is proposed as an example of a technique for managing functions supported by a system. A table in which whether or not each function is supported is associated with a bit is referred to and whether or not a function corresponding to a command inputted by a user is supported is checked.

Japanese Laid-open Patent Publication No. 01-259422
Japanese Laid-open Patent Publication No. 03-8026

By the way, when firmware to be executed is switched to another version firmware, some processing functions may not be supported after the switching. For example, there are cases where firmware to be executed by an electronic device is switched from new-version firmware to old-version firmware according to the specifications or the like of an external device which controls the electronic device. In such cases, a processing function supported by the new-version firmware may not be supported by the old-version firmware.

If there is a processing function which is not supported after switching firmware to be executed to another version firmware in this way, then an abnormality may occur at the time of executing another version firmware. For example, after firmware to be executed is switched to another version firmware, a set value unique to the firmware before the switching may remain in a setting table which is referred to by the firmware after the switching. If the firmware after the switching is executed in this state, then the set value which remains in the setting table may be recognized as abnormal information and a process may not be performed normally. As a result, an abnormality may occur in the operation of an electronic device.

In order to solve this problem, a manager performs, for example, the following work before switching firmware to be executed. First the manager determines whether there is consistency between a set value in a setting table before switching and a set value in a setting table after switching. If the manager determines that there is a problem about the consistency, then the manager specifies an item in the setting table which will have a bad influence at the time of executing firmware after the switching, and performs operation such as rewriting or deleting a value set in the item specified.

However, it takes a long time for the manager to perform the above work. In addition, this work requires an advanced knowledge. Furthermore, such a problem may arise not only from firmware but also from various programs.

SUMMARY

According to an aspect of the present invention, an information processing apparatus includes a processing function determination section which determines, of processing functions realized by a first program, a differential processing function that is not realized at the time of a second program being executed in place of the first program and a control information determination section which reads out relation information for associating a plurality of processing functions realized by at least the first program with one or more pieces of control information related to each of the plurality of processing functions from a storage section and which determines control information related to the differential processing function by the use of the relation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates the relationship between a function information bit and a processing function;

FIG. 12 illustrates an example of information stored in a screen table;

FIG. 13 is a view for describing an example of a process performed by a screen extraction section;

DESCRIPTION OF EMBODIMENTS

Figure 1:
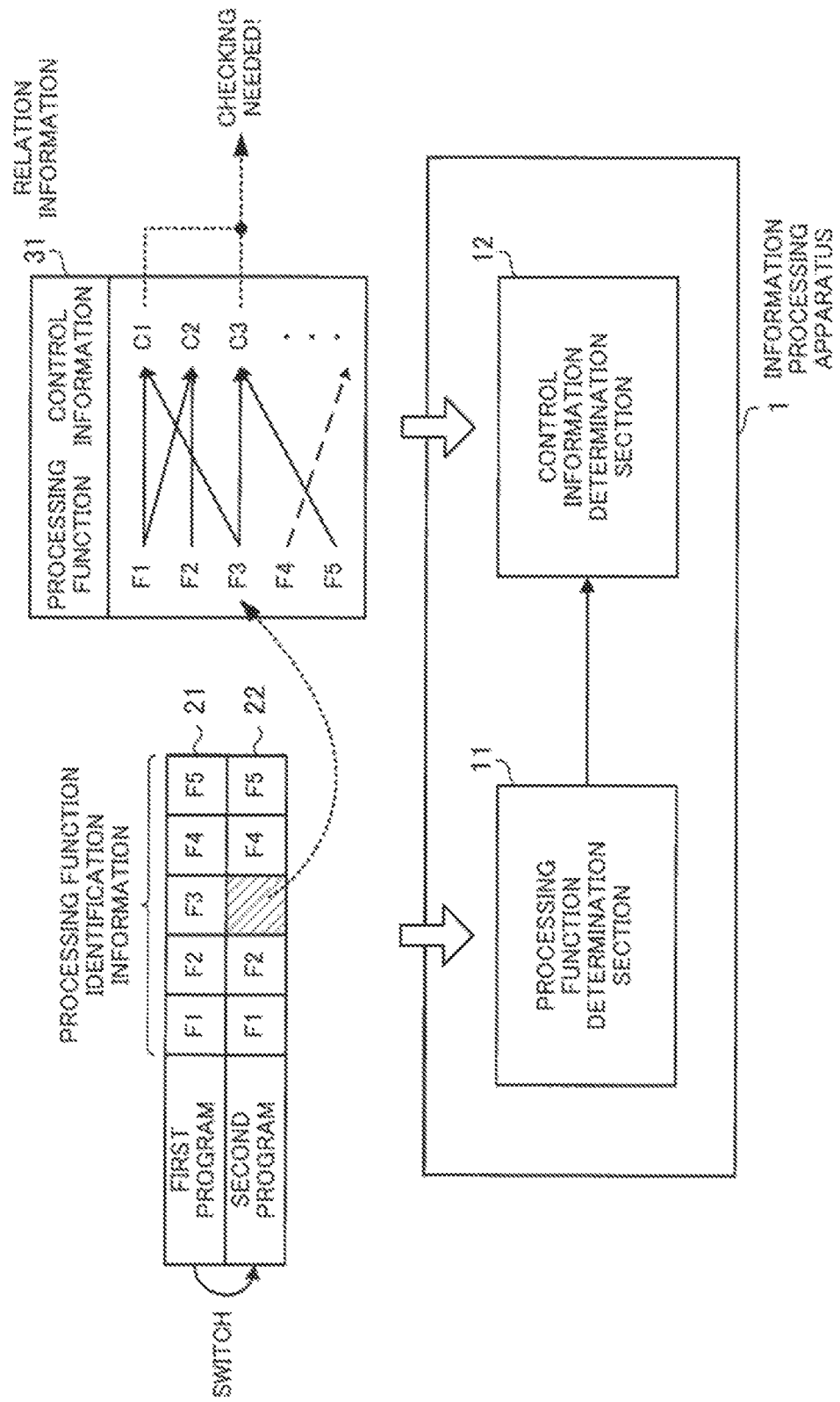
FIG. 1 illustrates the structure of an information processing apparatus according to a first embodiment.

Embodiments will now be described in detail with reference to the accompanying drawings, wherein like reference numerals refer to like elements throughout.

First Embodiment

FIG. 1 illustrates the structure of an information processing apparatus according to a first embodiment.

An information processing apparatus 1 illustrated in FIG. 1 performs the process of supporting work performed at the time of switching a program to be executed on a unit from a first program to a second program. For example, the first program and the second program may be executed by the information processing apparatus 1 itself illustrated in FIG. 1. Alternatively, the first program and the second program may be executed by an apparatus other than the information processing apparatus 1. It is assumed that after a program to be executed on the unit is switched, only the second program is executed. The first program is not executed. However, the first program may be executed or may not be executed before a program to be executed on the unit is switched.

The second program may be a prepared program other than the first program or a program generated by converting the first program. When the second program is executed, at least part of plural pieces of control information referred to at the time of executing the first program are referred to. For example, main functions realized by the first program and the second program are the same and their names are the same. However, they differ in version number. Alternatively, the second program has another name and is offered as a new program. However, the second program takes over most of functions realized by the first program. In the first embodiment control information means an item for which a value used for control is set. However, control information may mean a value itself set for an item.

The information processing apparatus 1 includes a processing function determination section 11 and a control information determination section 12 for performing the process of supporting work for switching a program to be executed. For example, a CPU (Central Processing Unit) included in the information processing apparatus 1 executes a determined work support program. By doing so, processes by the processing function determination section 11 and the control information determination section 12 are realized. This work support program may be incorporated into, for example, the first program.

The processing function determination section 11 determines a differential processing function corresponding to a processing function which is realized by the first program and which is not realized by the second program. For example, the processing function determination section 11 determines a differential processing function on the basis of processing function identification information 21 for identifying processing functions realized by the first program and processing function identification information 22 for identifying processing functions realized by the second program. The processing function identification information 21 and the processing function identification information 22 include, for example, information indicative of the processing functions realized by the first and second programs respectively. The processing function identification information 21 and the processing function identification information 22 may include, for example, information indicative of whether each of the plurality of processing functions is realized by the first and second programs respectively.

The control information determination section 12 determines control information related to the differential processing function determined by the processing function determination section 11. To be concrete, the control information determination section 12 reads out relation information 31 by which the plurality of processing functions are associated with one or more pieces of control information related to each processing function from a storage unit (not illustrated). The control information determination section 12 then determines control information related to the differential processing function on the basis of the relation information 31 read out. When the control information determination section 12 determines control information related to the differential processing function, the control information determination section 12 outputs, for example, information for identifying the control information determined.

In the example illustrated in FIG. 1, processing functions F1 through F5 are realized by the first program and the processing functions F1, F2, F4, and F5 are realized by the second program. In this case, the processing function determination section 11 determines that the processing function F3 is a differential processing function. Of control information C1, C2, and C3, on the other hand, the control information C1 and C3 are associated with the processing function F3 in the relation information 31. Accordingly, the control information determination section 12 determines that the control information C1 and C3 are control information related to the processing function F3 which is a differential processing function.

It is assumed that there is a differential processing function and that a program to be executed is switched from the first program to the second program. In this case, an abnormality may occur because of, for example, control information related to the differential processing function while the second program is being executed. Accordingly, a person who performs work for switching a program to be executed determines before executing the second program whether there is a differential processing function. If there is a differential processing function, then the person specifies control information related to the differential processing function. In addition, for example, the person changes the setting of the specified control information or deletes the specified control information.

With the above information processing apparatus 1, the differential processing function is specified and the control information related to the specified differential processing function is determined. Accordingly, there is no need for the person who performs the switching work to select control information to be checked from all control information. This reduces the burden on the person who performs the switching work. As a result, when the second program is executed after the switching work, the possibility that an abnormality may occur in a process diminishes.

By using the result of determination by the control information determination section 12, it is possible to prompt the person who performs the switching work via a screen or the like on, for example, the information processing apparatus 1 or an external device to check the determined control information. A possible method for prompting the person to check the determined control information is to, for example, display warning information by an image, characters, or the like on a display screen on which the determined control information is displayed.

In addition, a display screen on which a list of the control information determined by the control information determination section 12 is displayed or a screen on which a change in setting for the control information the list of which is displayed is accepted may be displayed on a monitor. Furthermore, a screen or the like may lead the person who performs the switching work to display a screen on which the control information determined by the control information determination section 12 is displayed or a screen on which a change in setting for the control information displayed is accepted. By adopting these methods, the efficiency of work performed by the person for checking the control information can be increased and the possibility that an abnormality may occur after the switching work can be reduced.

The relation information 31 may be set for, for example, each control information group including one or more pieces of control information and be information for identifying a processing function related to at least one piece of control information included in each control information group. In this case, the control information determination section 12 determines a control information group including control information related to a differential processing function on the basis of the relation information 31.

In addition, the relation information 31 may be set for, for example, each control information display screen on which control information included in a control information group is displayed. In this case, a processing function related to at least one piece of control information displayed on each control information display screen is identified by the relation information 31. The control information determination section 12 determines a control information display screen on which one or more pieces of control information related to a differential processing function are displayed on the basis of the relation information 31. Therefore, the process of displaying a control information display screen determined, the process of leading the person who performs the switching work to check a control information display screen determined, or the like can be performed efficiently by the information processing apparatus 1 or an external device.

A RAID device will be taken as an example of an electronic device on which the above first and second programs are executed, and an embodiment in which a storage control system includes a RAID device will now be described. In the following description, programs used as the first and second programs are of the same kind and differ in version number. The process of switching a program to be executed between programs which are of the same kind and which differ in version number will be referred to as a "revision process."

Second Embodiment

Figure 2:
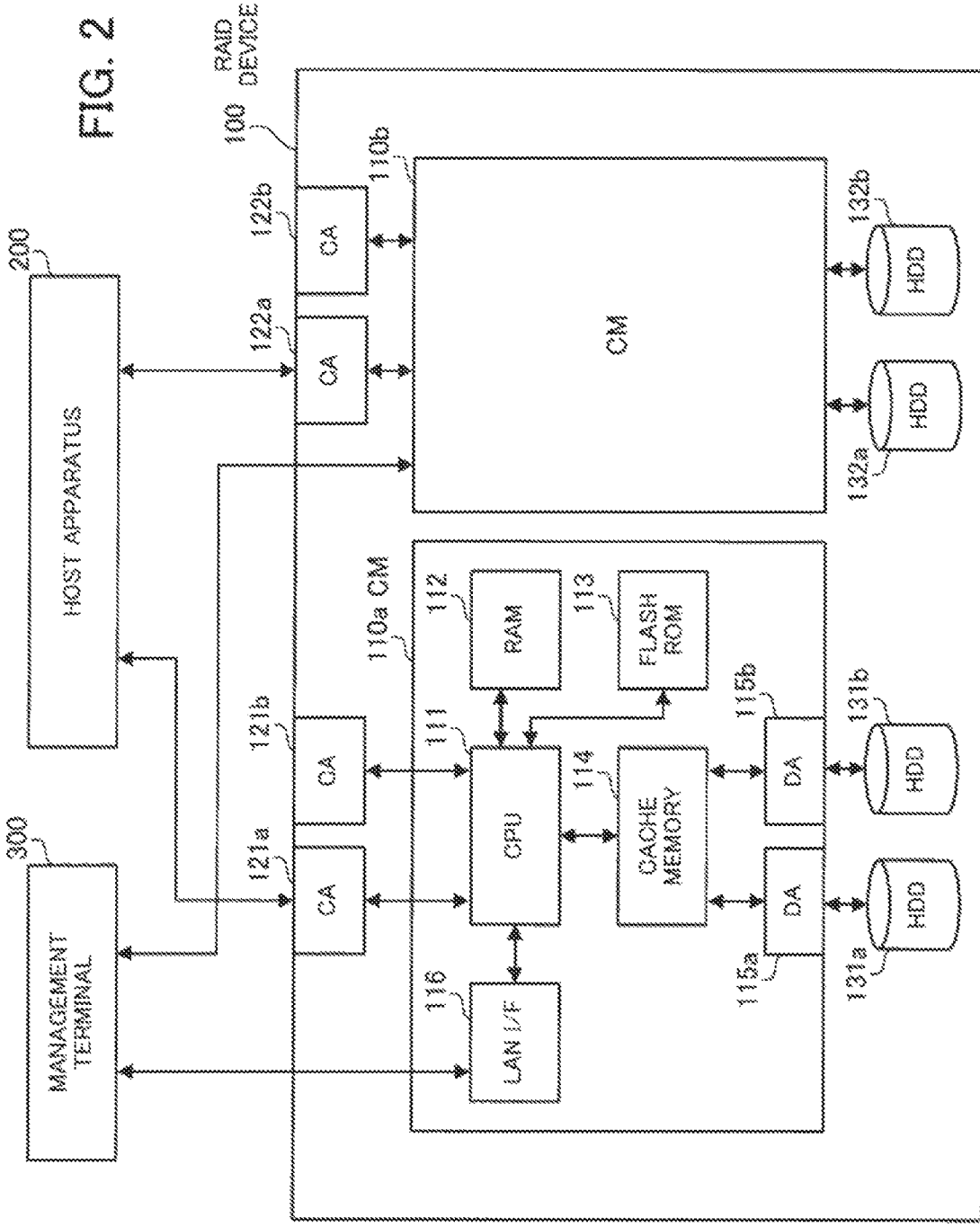
FIG. 2 illustrates the structure of a system according to a second embodiment.

FIG. 2 illustrates the structure of a system according to a second embodiment.

A RAID device 100 illustrated in FIG. 2 has a plurality of storage units and a storage control function for managing physical storage areas of these storage units by RAID. In this embodiment a HDD (Hard Disk Drive) is used as each storage unit. However, another kind of storage unit, such as a SSD (Solid State Drive), may be used.

A host apparatus 200 and a management terminal 300 are connected to the RAID device 100. In response to operation by a user, the host apparatus 200 makes a request to access a logical storage area provided by the RAID device 100. In response to operation by a manager, the management terminal 300 performs, for example, various processes for setting the RAID device 100, makes a request to perform the process of revising firmware to be executed on the RAID device 100.

The host apparatus 200 and the RAID device 100 are connected by an optical fiber via, for example, a fiber channel switch (not illustrated). The management terminal 300 and the RAID device 100 are connected by a LAN (Local Area Network). For example, the management terminal 300 and the RAID device 100 may be connected directly by a LAN cable or be connected via a LAN switch.

The RAID device 100 includes CMs (Centralized Modules) 110a and 110b, CAs (Channel Adapters) 121a, 121b, 122a, and 122b, and HDDs 131a, 131b, 132a, and 132b.

The CM 110a is a control module for managing physical storage areas of the HDDs 131a and 131b by the RAID and controlling, for example, access to these physical storage areas. The CM 110b is a control module for managing physical storage areas of the HDDs 132a and 132b by the RAID and controlling, for example, access to these physical storage areas. The RAID device 100 includes the two CMs 110a and 110b which manage the different storage units. As a result, redundancy occurs in the system and its reliability improves.

The CAs 121a and 121b provide an interface function for exchanging data between the host apparatus 200 and the CM 110a. In the example of FIG. 2, the host apparatus 200 accesses the CM 110a via the CA 121a. The CAs 122a and 122b provide an interface function for exchanging data between the host apparatus 200 and the CM 110b. In the example of FIG. 2, the host apparatus 200 accesses the CM 110b via the CA 122a.

The hardware configuration of the CMs 110a and 110b will now be described.

The CM 110a includes a CPU 111, a RAM (Random Access Memory) 112, a flash ROM (Read Only Memory) 113, a cache memory 114, DAs (Device Adapters) 115a and 115b, and a LAN interface (I/F) 116.

The CPU 111 controls the whole of the CM 110a overall by executing programs stored in the flash ROM 113 and the like. The RAM 112 temporarily stores at least part of a program executed by the CPU 111 and various pieces of data necessary for executing the program. The flash ROM 113 stores a program executed by the CPU 111, various pieces of data necessary for executing the program, and the like.

The cache memory 114 caches data read out from the HDD 131a or 131b. In addition, the cache memory 114 may temporarily store data which the CPU 111 needs to perform a process.

The DA 115a provides an interface function for exchanging data between the HDD 131a and the cache memory 114. The DA 115b provides an interface function for exchanging data between the HDD 131b and the cache memory 114.

The LAN interface 116 is connected to an external device, such as the management terminal 300, via a LAN cable and exchanges data with the external device.

The hardware configuration of the CM 110b is the same as that of the CM 110a, so its description will be omitted.

Figure 3:
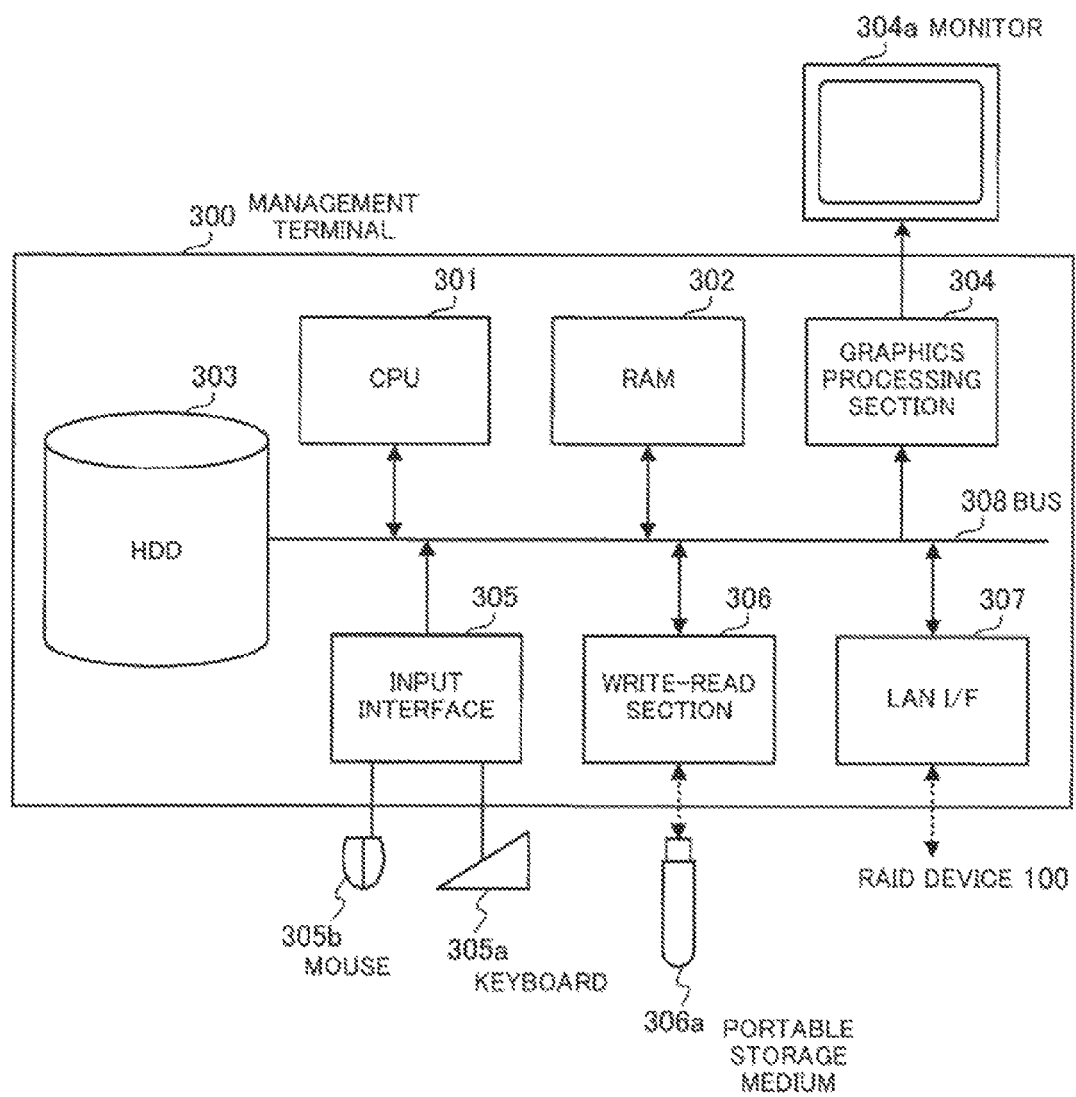
FIG. 3 illustrates the hardware configuration of a management terminal.

FIG. 3 illustrates the hardware configuration of the management terminal.

The management terminal 300 is realized by, for example, a computer illustrated in FIG. 3. This computer includes a CPU 301, a RAM 302, a HDD 303, a graphics processing section 304, an input interface (I/F) 305, a write-read section 306, and a LAN interface (I/F) 307. These components are connected to one another by a bus 308.

The CPU 301 controls the whole of the computer overall by executing various programs stored in the HDD 303. The RAM 302 temporarily stores at least part of a program executed by the CPU 301 and various pieces of data necessary for executing the program. The HDD 303 stores programs executed by the CPU 301, various pieces of data necessary for executing the programs, and the like.

A monitor 304a, for example, is connected to the graphics processing section 304. In accordance with instructions from the CPU 301, the graphics processing unit 304 displays an image on a screen of the monitor 304a.

A keyboard 305a and a mouse 305b, for example, are connected to the input interface 305. The input interface 305 sends a signal sent from the keyboard 305a or the mouse 305b to the CPU 301 via the bus 308.

The write-read section 306 writes data which it receives from the CPU 301 via the bus 308 to a portable storage medium 306a. In addition, the write-read section 306 reads data from the portable storage medium 306a and sends the data to the CPU 301 via the bus 308. For example, an optical disk, a flexible disk, or a semiconductor memory connected via a USB (Universal Serial Bus) interface or the like can be used as the portable storage medium 306a.

The LAN interface 307 is connected to an external device, such as the RAID device 100, via a LAN cable and exchanges data with the external device.

The host apparatus 200 can also be realized by the same hardware configuration that is adopted in the management terminal 300 illustrated in FIG. 3.

Processes performed by the CMs 110a and 110b included in the RAID device 100 will now be described. The CMs 110a and 110b can perform the same processes, so only processes performed by the CM 110a will be described.

Figure 4:
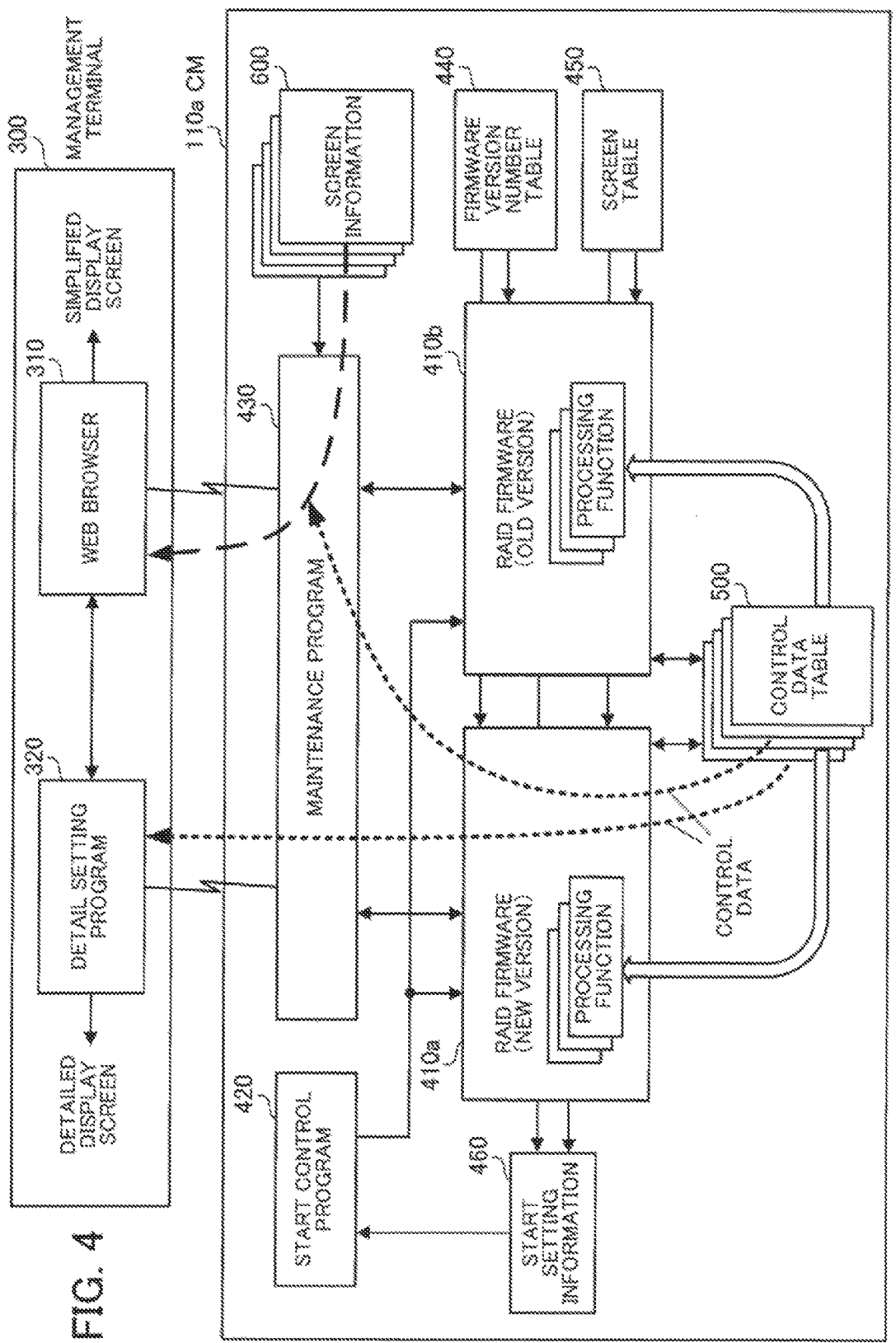
FIG. 4 illustrates programs executed by a CM and the management terminal.

FIG. 4 illustrates programs executed by the CM and the management terminal. A process which each program makes the CM 110a perform will be described briefly by the use of FIG. 4.

The CM 110a executes RAID firmware, a start control program 420, and a maintenance program 430. These programs are stored in the flash ROM 113 of the CM 110a. The CPU 111 reads these programs to the RAM 112 and executes them.

The RAID firmware is a main program executed by the CPU 111 of the CM 110a. The RAID firmware makes the CM 110a perform a RAID control process by which the physical storage areas of the HDDs 131a and 131b are managed by the RAID and a maintenance process for the RAID control process. As described later, the maintenance process includes the process of revising the RAID firmware.

When the RAID firmware is executed, a firmware version number table 440, a screen table 450, and a plurality of control data tables 500 are referred to.

The version number of the RAID firmware and function information indicative of whether various processing functions realized by the RAID control process are supported are associated with each other and are stored in the firmware version number table 440. Processing functions realized by the RAID control process include control functions at various RAID levels, the function of encrypting data to be stored in the HDDs 131a and 131b, and the like.

Information for identifying a simplified display screen used for simply reading or changing information in a control data table 500 and related function information indicative of a processing function which is realized by the RAID control process and which is related to each simplified display screen are associated with each other and are stored in the screen table 450. A processing function related to a simplified display screen is a processing function related to at least one control data item displayed on the simplified display screen.

When the process of revising the RAID firmware is performed by executing the RAID firmware, the firmware version number table 440 and the screen table 450 are referred to.

Various pieces of control data necessary for performing the RAID control process are stored in each of the plurality of control data tables 500. Therefore, when the CPU 111 of the CM 110a executes the RAID firmware, the CPU 111 of the CM 110a performs the RAID control process while referring to control data in a control data table 500.

In addition, a control data table 500 includes related function information indicative of a processing function related to the control data table 500. A processing function related to a control data table 500 is a processing function related to at least one control data item recorded in the control data tables 500. A control data table 500 may be associated with related function information not by the control data table 500 but by another information.

The flash ROM 113 of the CM 110a includes areas in which RAID firmware 410a and RAID firmware 410b that differ in version number are stored. In FIG. 4, it is assumed that the version of the RAID firmware 410a is newer than that of the RAID firmware 410b.

The CPU 111 of the CM 110a executes one of the RAID firmware 410a and the RAID firmware 410b stored. Flag information indicative of which of the RAID firmware 410a and the RAID firmware 410b is executed is stored in start setting information 460. The start control program 420 is the first program that is executed by the CPU 111 at the time of starting the CM 110a. The CPU 111 executes the start control program 420 and performs a determined starting process such as system initialization. After that, the CPU 111 starts one of the RAID firmware 410a and the RAID firmware 410b on the basis of the flag information stored in the start setting information 460. When the RAID firmware is revised, the start setting information 460 is rewritten and then the CM 110a is restarted.

The maintenance program 430 mainly provides a GUI (Graphical User Interface) for controlling a maintenance process which the RAID firmware makes the CM 110a perform by the management terminal 300. In accordance with the maintenance program 430 the CM 110a reads out one of plural pieces of screen information 600 stored in the flash ROM 113 and requests control data necessary for display. At this time the CM 110a reads out the control data necessary for display from a control data table 500 in accordance with the RAID firmware 410a. In accordance with the maintenance program 430 the CM 110a then incorporates the control data read out from the control data table 500 into the piece of screen information 600 and outputs it to the management terminal 300. For example, each piece of screen information 600 includes HTML (HyperText Markup Language) data, image data, and the like which make up one simplified display screen.

A Web browser 310 is executed on the management terminal 300 and a Web browse window based on the Web browser 310 is displayed. When the management terminal 300 receives the piece of screen information 600 from the CM 110a, the management terminal 300 displays a simplified display screen based on the piece of screen information 600 received in the Web browse window. At this time the control data read out from the control data table 500 is displayed on the simplified display screen. In addition, a manager who operates the management terminal 300 can make the CM 110a perform processes, such as reading a control data table 500, changing setting in a control data table 500, and revising the RAID firmware, by requesting the switching of a simplified display screen, the setting of information, or the like via the Web browse window.

In addition, a detail setting program 320 for reading the contents of a control data table 500 in more detail and changing read control data is executed on the management terminal 300. In response to a request from the management terminal 300 on which the detail setting program 320 is executed, the maintenance program 430 also makes the CM 110a perform the process of reading out or updating control data in a control data table 500.

For example, in accordance with the RAID firmware 410a the CM 110a reads out control data for which the management terminal 300 makes a request from a control data table 500. In accordance with the maintenance program 430 the CM 110a then sends the control data read out from the control data table 500 to the management terminal 300. In accordance with the detail setting program 320 the management terminal 300 makes the monitor 304a display a detail setting screen on which the control data received from the CM 110a is displayed.

A process performed at the time of revising the RAID firmware will now be described briefly. In this embodiment it is assumed that a revision process performed by the CM 110a is a "downward revision." That is to say, an object of execution is switched from the new-version RAID firmware 410a to the old-version RAID firmware 410b.

In accordance with the RAID firmware 410a before the revision and the maintenance program 430 the CM 110a performs a revision process. When the management terminal 300 makes a request to perform a revision process, the CM 110a refers to the firmware version number table 440 and extracts a processing function which is supported by the RAID firmware 410a before the revision and which is not supported by the RAID firmware 410b after the revision. The processing function extracted will be referred to as a "differential processing function."

If a differential processing function is extracted, the CM 110a specifies control data which possibly needs checking from control data stored in the plurality of control data tables 500, and performs the process of making the manager check the control data specified. In this embodiment the following two processes can be performed as the process of making the manager check control data.

A first process is as follows. The manager is made to check control data via a simplified display screen displayed on the management terminal 300 by executing the Web browser 310. With the first process screen information 600 related to the differential processing function is specified on the basis of the screen table 450. The manager is prompted via a simplified display screen to see a screen based on the specified screen information 600. In this case, one or more pieces of control data which possibly need checking because of the presence of relation to the differential processing function are displayed on the screen based on the specified screen information 600. One or more pieces of control data read out from one or more control data tables 500 are displayed on the screen based on the specified screen information 600.

A second process is as follows. The manager is made to check control data via a detailed display screen displayed on the management terminal 300 by executing the detail setting program 320. With the second process, a control data table 500 related to the differential processing function is specified on the basis of related function information stored in each control data table 500 and control data stored in the specified control data table 500 is listed on the detailed display screen. In this case, the specified control data table 500 includes one or more pieces of control data which possibly need checking because of the presence of relation to the differential processing function.

Figure 5:
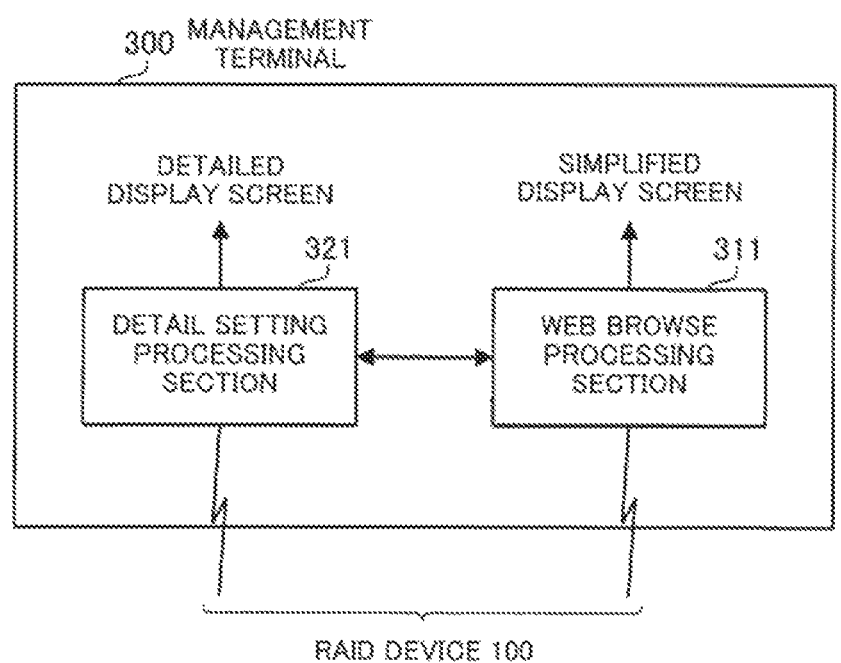
FIG. 5 is a block diagram of the function of the management terminal.

FIG. 5 is a block diagram of the function of the management terminal.

The management terminal 300 includes a Web browse processing section 311 and a detail setting processing section 321.

The CPU 301 executes the Web browser 310. By doing so, a process by the Web browse processing section 311 is realized. The Web browse processing section 311 makes the monitor 304a display a Web browse window and makes the monitor 304a display a simplified display screen based on screen information 600 received from the CM 110a in the Web browse window. In addition, in response to operation input provided on the simplified display screen by the manager, the Web browse processing section 311 requests the CM 110a to perform a process.

The CPU 301 executes the detail setting program 320. By doing so, a process by the detail setting processing section 321 is realized. The detail setting processing section 321 makes it possible to display control data stored in a control data table 500 in detail and change it in detail, compared with a simplified display screen based on screen information 600. The detail setting processing section 321 makes the monitor 304a display a detailed display screen and display control data received from the CM 110a on the detailed display screen. In addition, the detail setting processing section 321 sends control data changed in response to operation input provided by the manager to the CM 110a and makes a request to change setting.

It is assumed that the CM 110a executes the new-version RAID firmware 410a. Processes performed by the RAID firmware 410a and the maintenance program 430 will now be described in detail.

Figure 6:
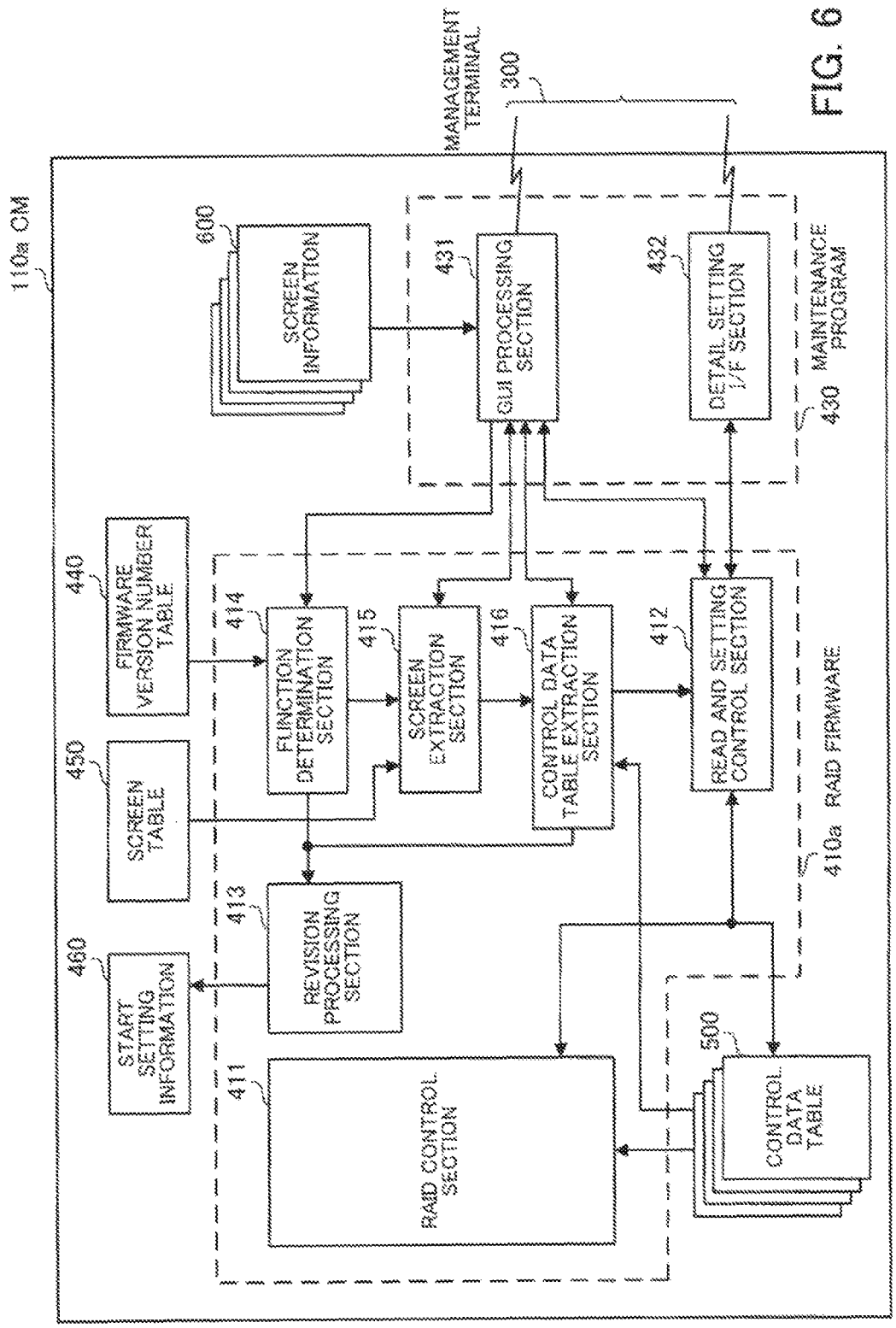
FIG. 6 is a block diagram of the function of the CM.

FIG. 6 is a block diagram of the function of the CM.

The CM 110a includes a RAID control section 411, a read and setting control section 412, a revision processing section 413, a function determination section 414, a screen extraction section 415, a control data table extraction section 416, a GUI processing section 431, and a detail setting interface (I/F) section 432.

The CPU 111 executes the maintenance program 430. By doing so, processes by the GUI processing section 431 and the detail setting interface section 432 are realized.

The GUI processing section 431 reads out one of the plural pieces of screen information 600 and sends it to the management terminal 300. A simplified display screen based on the piece of screen information 600 received is displayed on the management terminal 300 by a process performed by the Web browse processing section 311. When operation is performed on the displayed simplified display screen, the GUI processing section 431 receives a processing request corresponding to the operation from the Web browse processing section 311 and performs a process requested.

For example, when the GUI processing section 431 receives a request from the management terminal 300 to read control data stored in a control data table 500, the GUI processing section 431 reads out screen information 600 corresponding to the request. In addition, on the basis of information described in the screen information 600 read out, the GUI processing section 431 determines a control data item to be displayed on a simplified display screen, informs the read and setting control section 412 of the determined item, and makes a request to read out the control data set in the item of which the GUI processing section 431 informs the read and setting control section 412.

The read and setting control section 412 reads out the control data the reading out of which is requested from the control data table 500 and informs the GUI processing section 431 of the control data. The detail setting interface section 432 sends not only the control data acquired from the read and setting control section 412 but also the screen information 600 to the management terminal 300. A simplified display screen based on the screen information 600 sent is displayed on the management terminal 300 and the control data read out from the control data table 500 is displayed in a determined field on the simplified display screen.

For example, when the GUI processing section 431 receives a request from the management terminal 300 to set information in a control data table 500, the GUI processing section 431 informs the read and setting control section 412 of new control data received with the request and a control data item for which the request is made. The read and setting control section 412 changes control data set in the control data item of the control data table 500 of which the GUI processing section 431 informs the read and setting control section 412 to the new control data received from the management terminal 300. In addition, when the read and setting control section 412 updates the control data table 500, the read and setting control section 412 requests the RAID control section 411 at need to perform a determined process.

Figure 7:
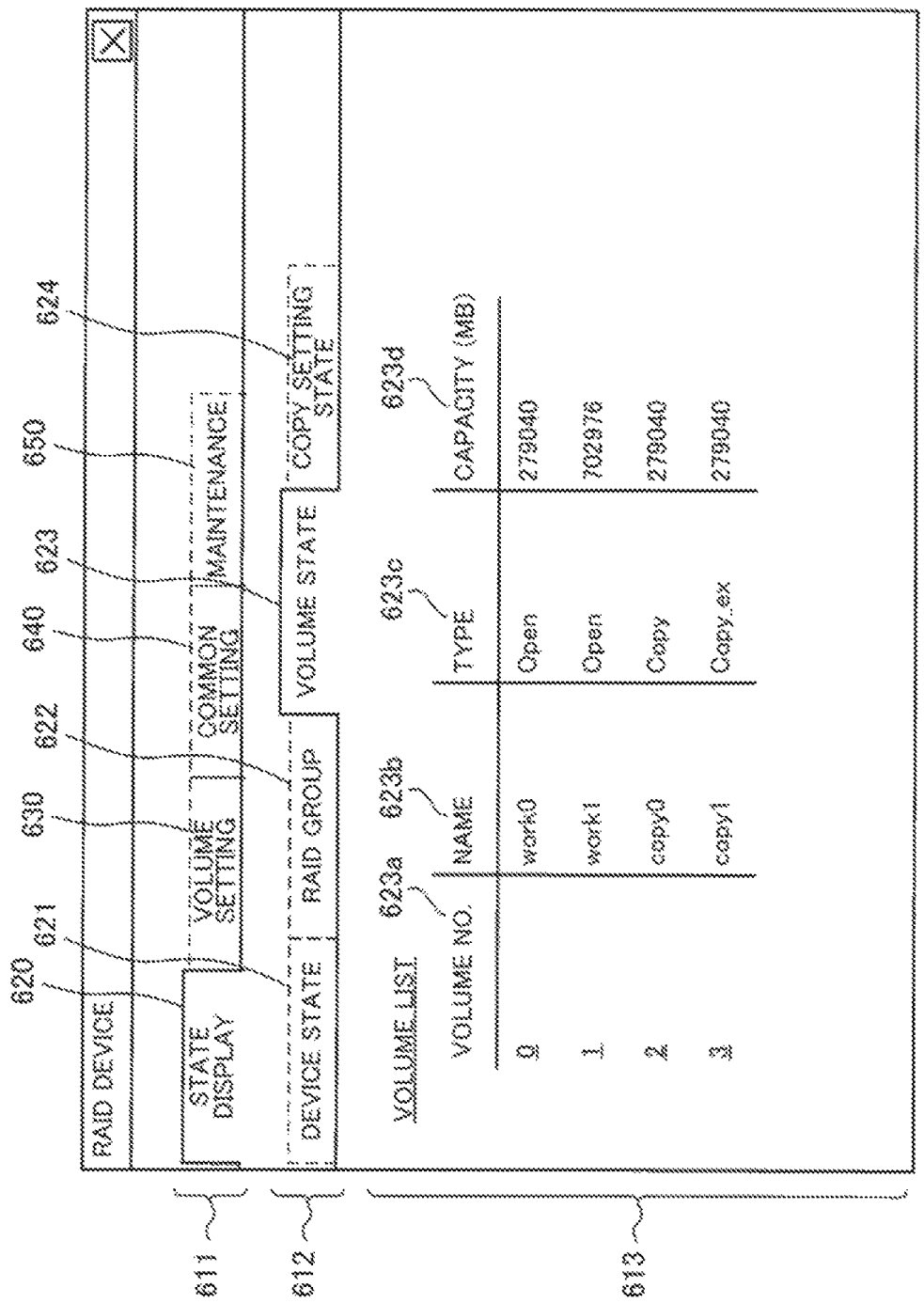
FIG. 7 illustrates an example of a simplified display screen based on screen information.

FIG. 7 illustrates an example of a simplified display screen based on screen information.

FIG. 7 illustrates an example of a simplified display screen displayed in a Web browse window displayed on the monitor 304a of the management terminal 300 which receives screen information 600. Basically tab selection areas 611 and 612 and a control data display and setting area 613 are displayed on a simplified display screen based on screen information 600.

A plurality of tabs are displayed in each of the tab selection areas 611 and 612 and one tab can be selected in response to operation input provided by the manager. Tabs in the tab selection area 612 correspond to a lower layer for each tab in the tab selection area 611. A plurality of tabs corresponding to a lower layer for a selected tab are displayed in the tab selection area 612.

In the example illustrated in FIG. 7, a total of 4 tabs, that is to say, a state display tab 620, a volume setting tab 630, a common setting tab 640, and a maintenance tab 650 are displayed in the tab selection area 611. The state display tab 620 is used for reading control data set for the CM 110a. The volume setting tab 630 is used for changing control data regarding a volume set for a physical storage area of the control data set for the CM 110a. The common setting tab 640 is used for changing control data common to volumes of the control data set for the CM 110a. The maintenance tab 650 is used for doing maintenance on hardware or software of the RAID device 100.

In the example illustrated in FIG. 7, the state display tab 620 is selected in the tab selection area 611. At this time a device state tab 621, a RAID group tab 622, a volume state tab 623, and a copy setting state tab 624 corresponding to a lower layer for the state display tab 620 are displayed in the tab selection area 612.

The device state tab 621 is used for displaying control data regarding the whole of the CM 110a. The RAID group tab 622 is used for displaying control data regarding the structure of a RAID group. The volume state tab 623 is used for displaying control data regarding a volume set by the CM 110a. The copy setting state tab 624 is used for displaying control data regarding a volume copy function for copying a volume to a determined storage area.

In the example illustrated in FIG. 7, the volume state tab 623 is selected in the tab selection area 612. "Volume List" in which the attributes of all volumes set by the CM 110a are enumerated is displayed in the control data display and setting area 613 as information corresponding to a lower layer for the volume state tab 623.

An Identification Number 623a, a Name 623b, a Type 623c, and Capacity 623d of each volume are read out from a determined control data table 500 and are displayed in the Volume List. The Type 623c is information indicative of a use for each volume. In FIG. 7, three kinds of information, that is to say, "Open," "Copy," and "Copy_ex" are indicated. "Open" means that a use for a volume is not limited. "Copy" means that a volume is used as a volume copy destination area. "Copy_ex" means that a volume is used as an expanded area of a volume copy destination.

The operation of selecting, for example, the Identification Number 623a of a volume is performed in the Volume List. By doing so, more detailed attribute information regarding the selected volume can be displayed in the control data display and setting area 613.

In response to tab selection operation in the tab selection area 611 or 612 or selection operation in the control data display and setting area 613, the Web browse processing section 311 which makes the monitor 304a display the above simplified display screen sends a selection result to the GUI processing section 431 of the CM 110a. The GUI processing section 431 returns screen information 600 and control data corresponding to the selection result. On the basis of the screen information 600 and the control data returned from the GUI processing section 431, the Web browse processing section 311 changes a state in which a tab is selected in the tab selection area 611 or 612, and changes information which the Web browse processing section 311 makes the monitor 304a display in the control data display and setting area 613.

The screen information 600 which the GUI processing section 431 sends to the Web browse processing section 311 is prepared according to, for example, combinations of tabs selected in the tab selection areas 611 and 612. If one or more pieces of control data are displayed in the control data display and setting area 613 on a screen, information for identifying a source from which the one or more pieces of control data displayed in the control data display and setting area 613 are read out is described in screen information 600 corresponding to the screen. That is to say, each piece of screen information 600 corresponds to one or more pieces of control data recorded in a control data table 500. The GUI processing section 431 reads control data corresponding to identification information described in the screen information 600 to be sent from a control data table 500 via the read and setting control section 412. The GUI processing section 431 then incorporates the read control data into the screen information 600 and sends it to the Web browse processing section 311.

If the state display tab 620 is selected in the tab selection area 611, only control data based on a control data table 500 is displayed in the control data display and setting area 613. In the case where the volume setting tab 630 and the common setting tab 640 are selected, however, control data based on a control data table 500 is not only displayed in the control data display and setting area 613 but the control data displayed can be changed. When the Web browse processing section 311 accepts operation input for changing the control data displayed, the Web browse processing section 311 sends the GUI processing section 431 of the CM 110a control data after the change and a corresponding control data item. The CM 110a changes the control data set in the corresponding control data item of the control data table 500 to the control data received.

As described later, if the maintenance tab 650 is selected in the tab selection area 611, a firmware revision tab used for performing the process of revising the RAID firmware is displayed in the tab selection area 612. When the manager selects the firmware revision tab, the manager provides operation input for information displayed in the control data display and setting area 613. By doing so, the process of revising the RAID firmware can be performed. In addition, as described later, if a problem arises as to a revision process, a warning is displayed for, for example, a corresponding tab in the tab selection area 611 or 612.

FIG. 6 will now be described again.

When the GUI processing section 431 receives a request from the Web browse processing section 311 of the management terminal 300 to perform the process of revising the RAID firmware, the GUI processing section 431 requests the function determination section 414 to perform a revision process, and informs the function determination section 414 of the version number of the RAID firmware after the revision. If, of processing functions which are realized by the RAID control process and which are supported by the RAID firmware before the revision, there is a processing function which is not supported by the RAID firmware after the revision, then the function determination section 414 stops the revision process.

At this time the GUI processing section 431 is informed by, for example, the screen extraction section 415 of identification information for screen information 600 related to the processing function which is not supported by the RAID firmware after the revision. The GUI processing section 431 makes the management terminal 300 make a display which prompts the manager to see a simplified display screen corresponding to the identification information of which the screen extraction section 415 informs the GUI processing section 431.

The detail setting interface section 432 performs a process in cooperation with the detail setting processing section 321 of the management terminal 300. In response to a request from the detail setting processing section 321, the detail setting interface section 432 sends the detail setting processing section 321 control data read out from a control data table 500 via the read and setting control section 412. In addition, when the detail setting processing section 321 changes control data, the detail setting interface section 432 receives changed control data and a corresponding control data item and informs the read and setting control section 412 of them. The detail setting interface section 432 then makes a request to change the control data set in the corresponding control data item in a control data table 500 to the received control data.

The CPU 111 executes the RAID firmware 410a. By doing so, processes by the RAID control section 411, the read and setting control section 412, the revision processing section 413, the function determination section 414, the screen extraction section 415, and the control data table extraction section 416 are realized.

The RAID control section 411 is a main processing block realized by executing the RAID firmware 410a and manages the physical storage areas of the HDDs 131a and 131b by the RAID. The RAID control section 411 operates on the basis of control data set in a control data table 500.

In response to a request from the GUI processing section 431, the detail setting interface section 432, or the control data table extraction section 416, the read and setting control section 412 reads out control data from a control data table 500. In addition, in response to a request from the GUI processing section 431 or the detail setting interface section 432, the read and setting control section 412 updates control data in a control data table 500. When the read and setting control section 412 updates a control data table 500, the read and setting control section 412 requests the RAID control section 411 at need to perform a determined process.

When the function determination section 414 permits performing a revision process, the revision processing section 413 rewrites the start setting information 460 and then resets the system of the CM 110a. In this embodiment the revision processing section 413 performs a downward revision process. That is to say, the revision processing section 413 switches an object of execution to the old-version RAID firmware 410b.

For example, the RAID firmware 410b after the revision is stored in advance in the flash ROM 113 of the CM 110a. However, the RAID firmware 410b after the revision may be read from an external device, such as the HDD 131a or 131b or the management terminal 300, and be written to the flash ROM 113 under the control of the revision processing section 413.

By the way, processing functions supported by the RAID control section 411 depend on the version number of the RAID firmware. For example, there is a possibility that processing functions, such as control functions at various RAID levels and the function of encrypting data to be stored in the HDDs 131a and 131b, are not supported by every version of the RAID firmware. In particular, of processing functions which are supported by new-version RAID firmware, there may be a processing function which is not supported by old-version RAID firmware.

When the function determination section 414 receives a request from the GUI processing section 431 to begin a revision process, the function determination section 414 refers to the firmware version number table 440 and determines whether there is a differential between processing functions supported by the RAID firmware before the revision and processing functions supported by the RAID firmware after the revision. If there is a processing function which is supported by the RAID firmware 410a before the revision and which is not supported by the RAID firmware 410b after the revision, then the function determination section 414 stops the revision process. The function determination section 414 then makes the operation of the screen extraction section 415 and the control data table extraction section 416 begin.

The screen extraction section 415 refers to the screen table 450, extracts identification information for screen information 600 related to the processing function extracted as a differential, and informs the GUI processing section 431 of the identification information extracted.

The control data table extraction section 416 extracts a control data table 500 in which control data related to the processing function extracted as a differential is set, and informs the read and setting control section 412 of identification information for identifying the control data table 500 extracted.

The processes performed by the function determination section 414, the screen extraction section 415, and the control data table extraction section 416 will now be described more concretely.

Figure 8:
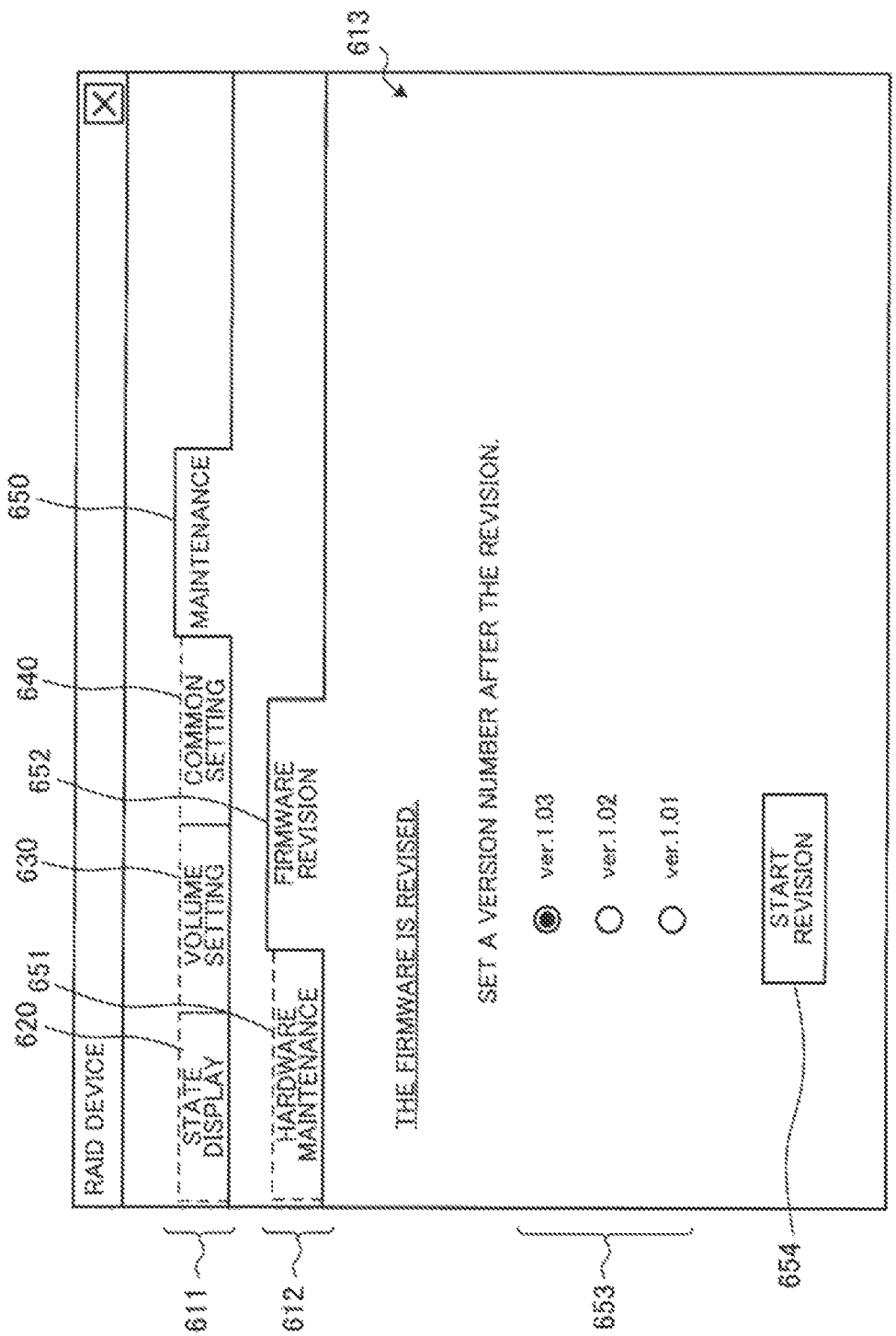
FIG. 8 illustrates an example of a simplified display screen for requesting a revision process.

FIG. 8 illustrates an example of a simplified display screen for requesting a revision process.

When the maintenance tab 650 on a simplified display screen is selected by operation input provided by the manager on the management terminal 300, a hardware maintenance tab 651 and a firmware revision tab 652 are displayed in the tab selection area 612 as illustrated in FIG. 8. The hardware maintenance tab 651 is used for doing maintenance on the hardware of the RAID device 100.

When the firmware revision tab 652 is selected, information for requesting a RAID firmware revision process is displayed in the control data display and setting area 613. For example, a version number selection section 653 and a Start Revision button 654 are displayed in the control data display and setting area 613.

The version number of the RAID firmware after the revision is selected by a radio button in the version number selection section 653. After any one radio button is selected, the Start Revision button 654 is clicked. By doing so, the Web browse processing section 311 of the management terminal 300 requests the GUI processing section 431 of the CM 110a to begin a revision process. In addition, the Web browse processing section 311 sends the GUI processing section 431 identification information indicative of a version number selected.

When the GUI processing section 431 receives the request to begin a revision process, the GUI processing section 431 informs the function determination section 414 of the received identification information indicative of the version number and requests the function determination section 414 to begin the process of switching the version number of the RAID firmware to the version number of which the GUI processing section 431 informs the function determination section 414. As a result, a process by the function determination section 414 is begun. The function determination section 414 performs the process while referring to the following firmware version number table 440.

Figure 9:
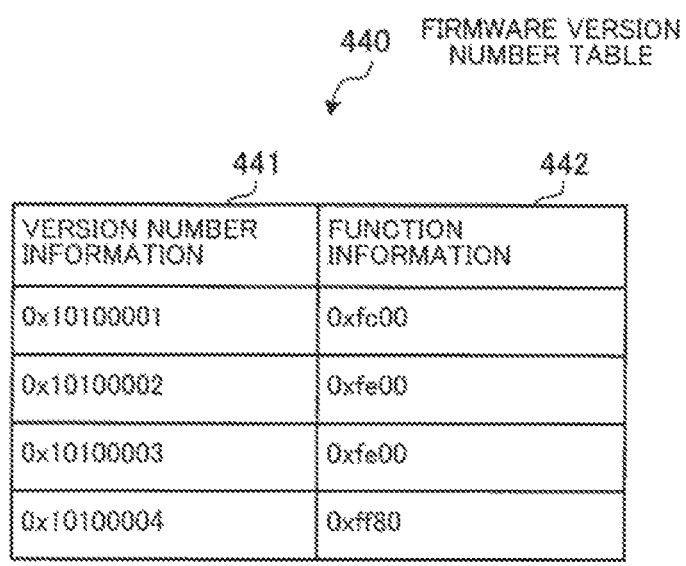
FIG. 9 illustrates an example of information stored in a firmware version number table.

FIG. 9 illustrates an example of information stored in the firmware version number table.

Version number information 441 indicative of a version number of the RAID firmware and function information 442 indicative of processing functions supported are stored in the firmware version number table 440. The function information 442 is associated with the version number information 441 in the firmware version number table 440. The function information 442 is a bit string in which one bit is assigned to one processing function. In FIG. 9, a bit string which is the function information 442 is represented as a hexadecimal number.

FIG. 10 illustrates the relationship between a function information bit and a processing function.

As indicated in FIG. 10, for example, the function information 442 is represented as a bit string made up of 16 bits. One bit is assigned to one processing function. In the example indicated in FIG. 10, the 16 bits are assigned to processing functions A, B, . . . , O, and P, respectively, from the high order side. If a corresponding processing function is supported, then the value of a bit included in the function information 442 is set to "1." If a corresponding processing function is not supported, then the value of a bit included in the function information 442 is set to "0."

In the example indicated in FIG. 10, the value of the function information 442 is "1111 1100 0000 0000" (which is represented as "fc00" by hexadecimal notation). This means that a corresponding version of the RAID firmware supports the processing functions A through F and that the corresponding version of the RAID firmware does not support the processing functions G through P.

Figure 11:
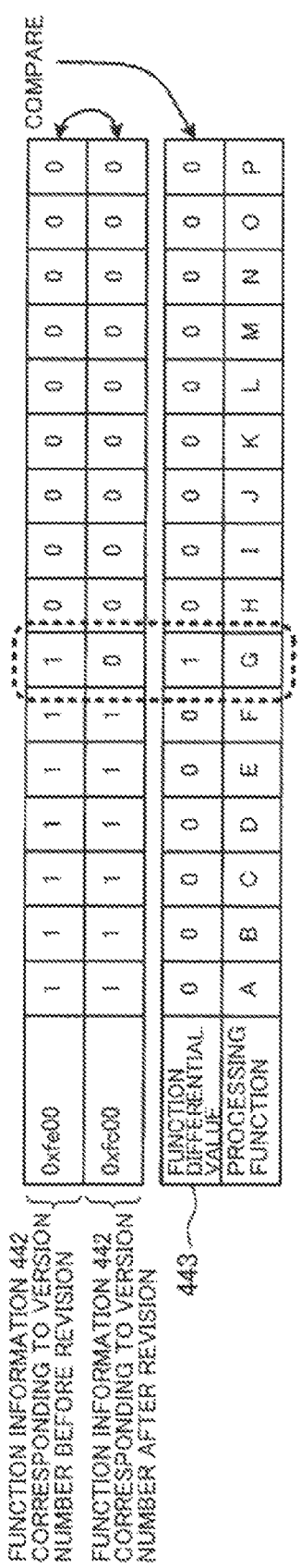
FIG. 11 illustrates an example of an operation performed by a function determination section.

FIG. 11 illustrates an example of an operation performed by the function determination section.

When the function determination section 414 receives a request from the GUI processing section 431 to begin a revision process, the function determination section 414 is also informed by the GUI processing section 431 of a version number of the RAID firmware after the revision. The function determination section 414 read out function information 442 corresponding to the version number after the revision and function information 442 corresponding to a version number before the revision from the firmware version number table 440.

The function determination section 414 compares the function information 442 corresponding to the version number after the revision and the function information 442 corresponding to the version number before the revision, and determines a bit the value of which is set to "1" in the function information 442 corresponding to the version number before the revision and the value of which is set to "0" in the function information 442 corresponding to the version number after the revision. This bit determination process can be performed by, for example, calculating the bitwise logical product of the function information 442 corresponding to the version number before the revision and inverted information obtained by inverting the function information 442 corresponding to the version number after the revision. Operation results are outputted as function differential values 443. If there is a bit the function differential value 443 of which is "1", then a processing function corresponding to this bit is not supported by the RAID firmware 410b after the revision.

For example, if there is a guarantee that all of the processing functions supported by the old-version RAID firmware 410b are supported by the new-version RAID firmware 410a, then the above bit determination process can be performed by calculating the bitwise exclusive-OR of the function information 442 corresponding to the version number before the revision and the function information 442 corresponding to the version number after the revision.

In the example indicated in FIG. 11, the function information 442 corresponding to the version number before the revision and the function information 442 corresponding to the version number after the revision are "fe00" and "fc00", respectively, which are represented by the hexadecimal notation. Accordingly, only the function differential value 443 of the seventh bit from the high order side is "1" and the function determination section 414 recognizes that the RAID firmware 410b after the revision does not support the processing function G.

If the calculated function differential values 443 of all the bits are "0," then the function determination section 414 makes the revision processing section 413 begin a revision process. On the other hand, if there is a bit the calculated function differential value 443 of which is "1", then the function determination section 414 stops a revision process and makes the screen extraction section 415 or the control data table extraction section 416 begin a process. In this embodiment it is assumed that the function determination section 414 first makes the screen extraction section 415 begin a process.

FIG. 12 illustrates an example of information stored in the screen table.

Screen identification information 451 for identifying the screen information 600 and related function information 452 indicative of related processing functions are stored in the screen table 450. The related function information 452 is associated with the screen identification information 451 in the screen table 450. The related function information 452 is represented as a bit string. The number of bits included in the bit string is the same with the function information 442. One bit is assigned to one processing function. The order of assignment is the same with the function information 442. The bit value "1" means that corresponding screen information 600 is related to a processing function corresponding to a bit. That is to say, the related function information 452 indicates which processing function a control data item displayed on a simplified display screen based on corresponding screen information 600 is related to.

In the example indicated in FIG. 12, the related function information 452 is represented as a hexadecimal number. In FIG. 12, for example, "0010 1111 0000 0001" (which is represented as "2f01" by the hexadecimal notation) is associated as related function information 452 with screen information 600 identified by "simplified display screen A." In this case, a control data item displayed on a simplified display screen corresponding to the "simplified display screen A" is related to the processing functions C, E through H, and P. In addition, it is assumed that the simplified display screen corresponding to the "simplified display screen A" is used for setting control data. A change in control data made by operation on this simplified display screen may have an influence on the processing functions C, E through H, and P.

FIG. 13 is a view for describing an example of a process performed by the screen extraction section.

The screen extraction section 415 reads out related function information 452 in order from the screen table 450 and compares it with the function differential values 443 calculated by the function determination section 414. Of the bits included in the related function information 452 read out from the screen table 450, the screen extraction section 415 extracts a value of a bit for which the function differential value 443 is "1." If the extracted value is "1," then the screen extraction section 415 acquires screen identification information 451 associated with the related function information 452 from the screen table 450. This process can be performed by, for example, the following method. The bitwise logical product of the related function information 452 and the function differential values 443 is calculated. If there is a bit the value of which is "1," then screen identification information 451 corresponding to the related function information 452 is acquired.

In the example indicated in FIG. 13, of bits which make up the function differential values 443, the value of the bit corresponding to the processing function G is "1." Furthermore, of four pieces of related function information 452 taken as examples, the values of the bits corresponding to the processing function G are "1" in the pieces of related function information 452 corresponding to "simplified display screen A" and "simplified display screen D." Therefore, the screen extraction section 415 acquires the "simplified display screen A" and the "simplified display screen D" as screen identification information 451.

The screen extraction section 415 requests the GUI processing section 431 to perform a display control process based on the screen identification information 451 acquired. The GUI processing section 431 performs a display control process which prompts the manager to see a simplified display screen corresponding to the screen identification information 451 acquired by the screen extraction section 415. For example, a warning image which prompts the manager to see a simplified display screen corresponding to the screen identification information 451 acquired by the screen extraction section 415 is displayed on a simplified display screen which the GUI processing section 431 makes the management terminal 300 display.

Figure 14:
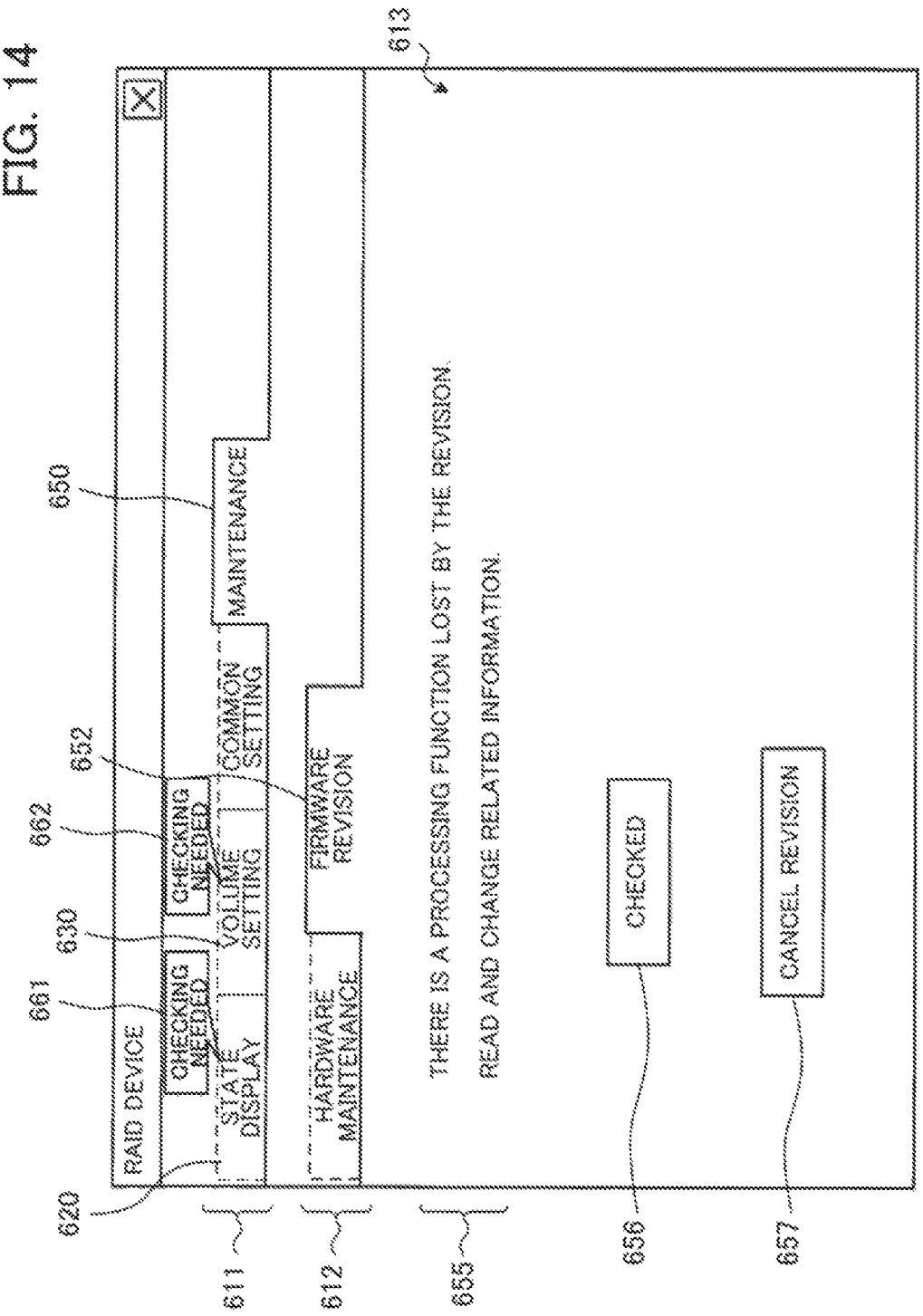
FIG. 14 illustrates an example of a simplified display screen displayed at the time of a revision process being stopped.

FIG. 14 illustrates an example of a simplified display screen displayed at the time of a revision process being stopped.

When the GUI processing section 431 receives the request from the screen extraction section 415 to perform a display control process based on the screen identification information 451, the GUI processing section 431 sends the Web browse processing section 311 of the management terminal 300 new screen information 600 and makes a simplified display screen switch to, for example, a simplified display screen illustrated in FIG. 14. A character area 655, a Checked button 656, and a Cancel button 657 are displayed in the control data display and setting area 613 on the simplified display screen illustrated in FIG. 14.

For example, character information which informs the manager that there is a processing function which is not supported in the case of a revision process being continued and which prompts the manager to check control data regarding the processing function is displayed in the character area 655. If the manager checks necessary information on a simplified display screen and continues the revision process, then the Checked button 656 is selected. If the manager terminates the revision process, then the Cancel button 657 is selected.

In addition, warning images 661 and 662 for warning the manager that checking is needed are displayed in the tab selection area 611. In the example indicated in FIG. 14, the warning image 661 displayed is associated with the state display tab 620 and the warning image 662 displayed is associated with the volume setting tab 630. The warning image 661 indicates that control data to be checked is displayed on a simplified display screen corresponding to a lower layer for the state display tab 620. The warning image 662 indicates that control data to be checked is displayed on a simplified display screen corresponding to a lower layer for the volume setting tab 630. The warning images 661 and 662 prompt the manager to check the control data.

Figure 15:
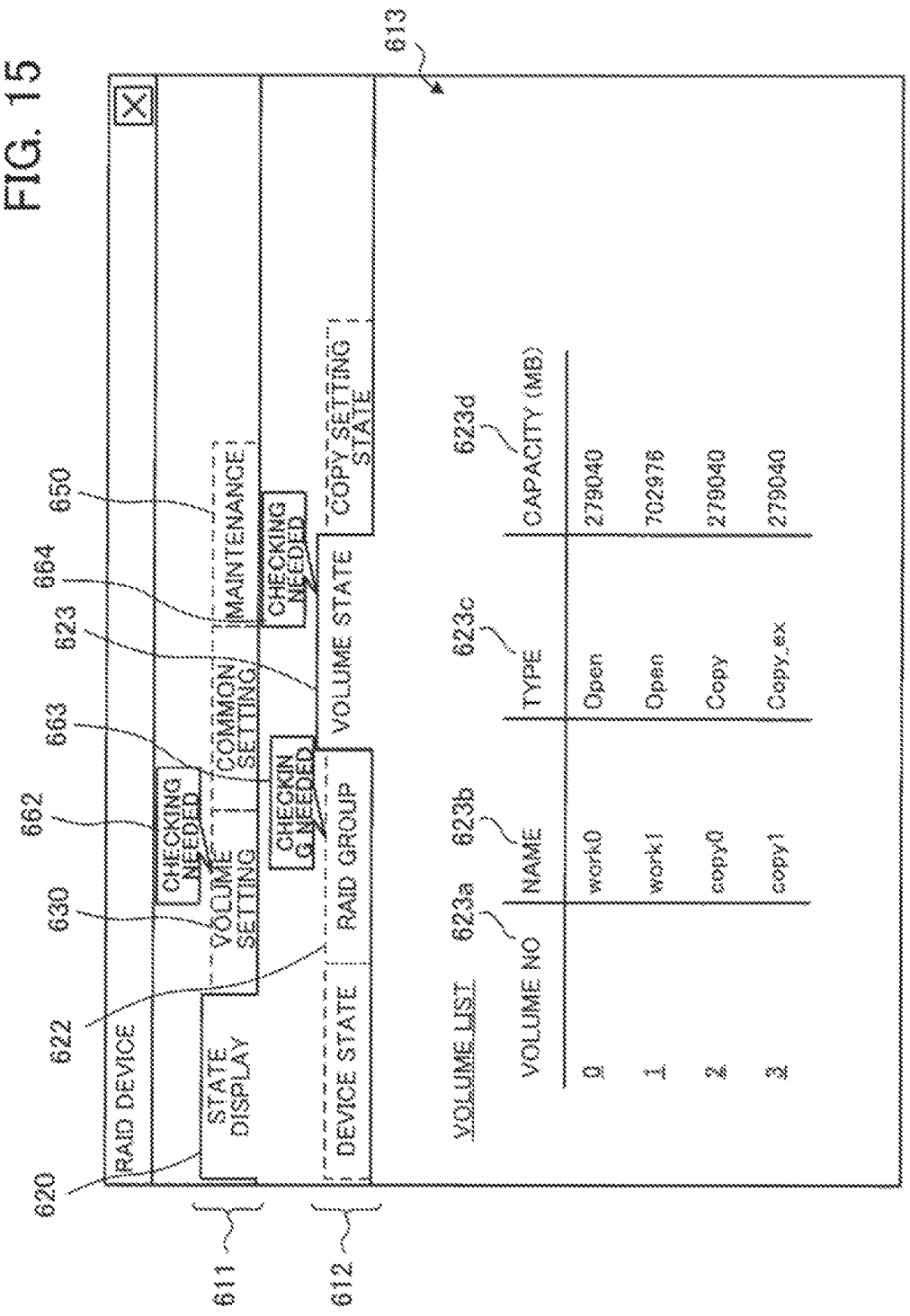
FIG. 15 illustrates an example of a simplified display screen displayed at the time of a tab with which a warning image is associated being selected.

When operation for selecting, for example, the state display tab 620 is performed on the simplified display screen illustrated in FIG. 14, the simplified display screen switches to a simplified display screen illustrated in FIG. 15.

FIG. 15 illustrates an example of a simplified display screen displayed at the time of the tab with which the warning image is associated being selected.

When operation for selecting the state display tab 620 is performed, a simplified display screen obtained by adding warning images 663 and 664 to the simplified display screen illustrated in FIG. 7 is displayed. In the tab selection area 612 on this simplified display screen, as illustrated in FIG. 15, the warning image 663 displayed is associated with the RAID group tab 622 and the warning image 664 displayed is associated with the volume state tab 623.

The warning image 663 indicates that control data which is displayed in the control data display and setting area 613 at the time of the RAID group tab 622 being selected is related to a processing function which is not supported after the revision process. The warning image 664 indicates that control data which is displayed in the control data display and setting area 613 at the time of the volume state tab 623 being selected is related to a processing function which is not supported after the revision process.

When the volume setting tab 630 is selected on the simplified display screen illustrated in FIG. 14 or 15, determined control data is displayed on the simplified display screen corresponding to a lower layer for the volume setting tab 630 (not illustrated). At this time control data displayed can be changed by operation input provided by the manager. If operation input for making a request to change control data is provided, the Web browse processing section 311 sends the GUI processing section 431 of the CM 110a changed control data and a corresponding control data item and requests the GUI processing section 431 to change the control data. The GUI processing section 431 informs the read and setting control section 412 of the control data and the corresponding control data item received from the Web browse processing section 311. Of control data in a control data table 500, the read and setting control section 412 changes the control data set in the control data item of which the read and setting control section 412 is informed to the control data of which the read and setting control section 412 is informed.

The GUI processing section 431 uses the following procedure for making the management terminal 300 display, for example, a simplified display screen like that which is illustrated in FIG. 14 or 15 and to which the warning images are added. The GUI processing section 431 determines a tab in the tab selection area 611 or 612 a lower layer for which screen information 600 corresponding to screen identification information 451 acquired by the screen extraction section 415 is associated with. The GUI processing section 431 then reads screen information 600 corresponding to a simplified display screen to be displayed next, edits the screen information 600 so as to display a warning image associated with the determined tab, and sends the edited screen information 600 to the Web browse processing section 311 of the management terminal 300.

In the example indicated in FIG. 14 or 15, the manager is informed of an object of checking by displaying the warning images associated with the tabs. However, a method for informing the manager of an object of checking is not limited to this. For example, the method of highlighting character information for a tab to be checked, the method of changing the color of character information for a tab to be checked, the method of making character information for a tab to be checked flash, or the like may be adopted.

For example, the manager checks or changes control data on a simplified display screen. After that, the manager selects the maintenance tab 650 to display again the simplified display screen illustrated in FIG. 14. At this time the manager clicks the Checked button 656. By doing so, the Web browse processing section 311 informs the GUI processing section 431 of the CM 110a that the simplified display screen has been checked. The GUI processing section 431 which is informed that the simplified display screen has been checked informs the screen extraction section 415 of the completion of the process. The screen extraction section 415 which is informed of the completion of the process makes the control data table extraction section 416 begin a process.

On the basis of the function differential values 443 calculated by the function determination section 414, the control data table extraction section 416 extracts a control data table 500 in which the control data related to the processing function that is not supported after the revision is recorded.

Figure 16:
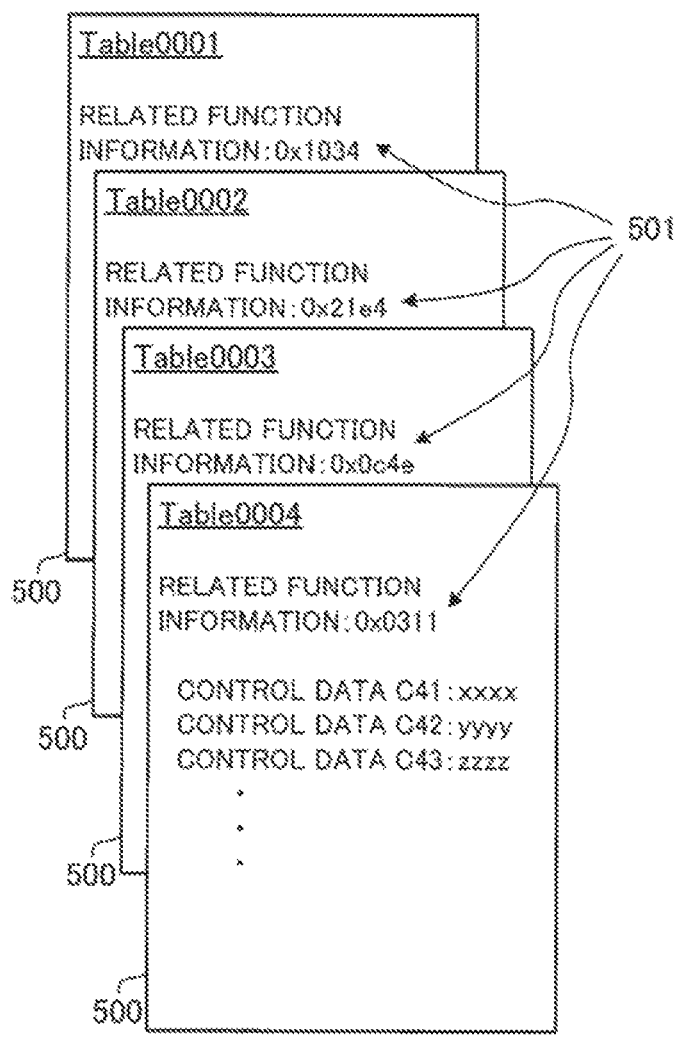
FIG. 16 illustrates information recorded in each control data table.

FIG. 16 illustrates information recorded in each control data table.

Various pieces of control data and related function information 501 are recorded in each control data table 500. The related function information 501 is represented as a bit string. The number of bits included in the bit string is the same with the function information 442. One bit is assigned to one processing function. The order of assignment is the same with the function information 442. The bit value "1" means that a control data table 500 is related to a processing function corresponding to a bit. That is to say, the related function information 501 indicates which processing function at least one control data item recorded in a corresponding control data table 500 is related to. In other words, the related function information 501 is used for identifying a processing function which may be influenced in the case of control data recorded in a corresponding control data table 500 being changed.

The control data table extraction section 416 scans each control data table 500 and reads out the related function information 501 in order. Of the bits of the related function information 501 read out, the control data table extraction section 416 extracts a value of a bit for which the function differential value 443 is "1." If the extracted value is "1," then the control data table extraction section 416 acquires identification information for identifying a control data table 500 in which the related function information 501 is recorded. This process can be performed by, for example, the following method. The bitwise logical product of the related function information 501 and the function differential value 443 is calculated. If there is a bit the value of which is "1," then identification information for a control data table 500 in which the related function information 501 is recorded is acquired.

When the control data table extraction section 416 acquires the identification information for the control data table 500, the control data table extraction section 416 requests the Web browse processing section 311 of the management terminal 300 via the GUI processing section 431 to start the detail setting program 320. The Web browse processing section 311 which receives the request starts the detail setting program 320. As a result, the detail setting processing section 321 starts.

In addition, the control data table extraction section 416 informs the read and setting control section 412 of the identification information acquired and requests it to perform the process of displaying a detailed display screen. The read and setting control section 412 which is requested to perform the process of displaying a detailed display screen reads out all control data from the control data table 500 corresponding to the identification information of which the read and setting control section 412 is informed. The read and setting control section 412 informs the detail setting interface section 432 of the control data read out and corresponding control data item names. The detail setting interface section 432 sends the detail setting processing section 321 of the management terminal 300 the control data and control data item names of which the detail setting interface section 432 is informed, and requests the detail setting processing section 321 to display the control data sent, together with the control data item names, on a detailed display screen.

Figure 17:
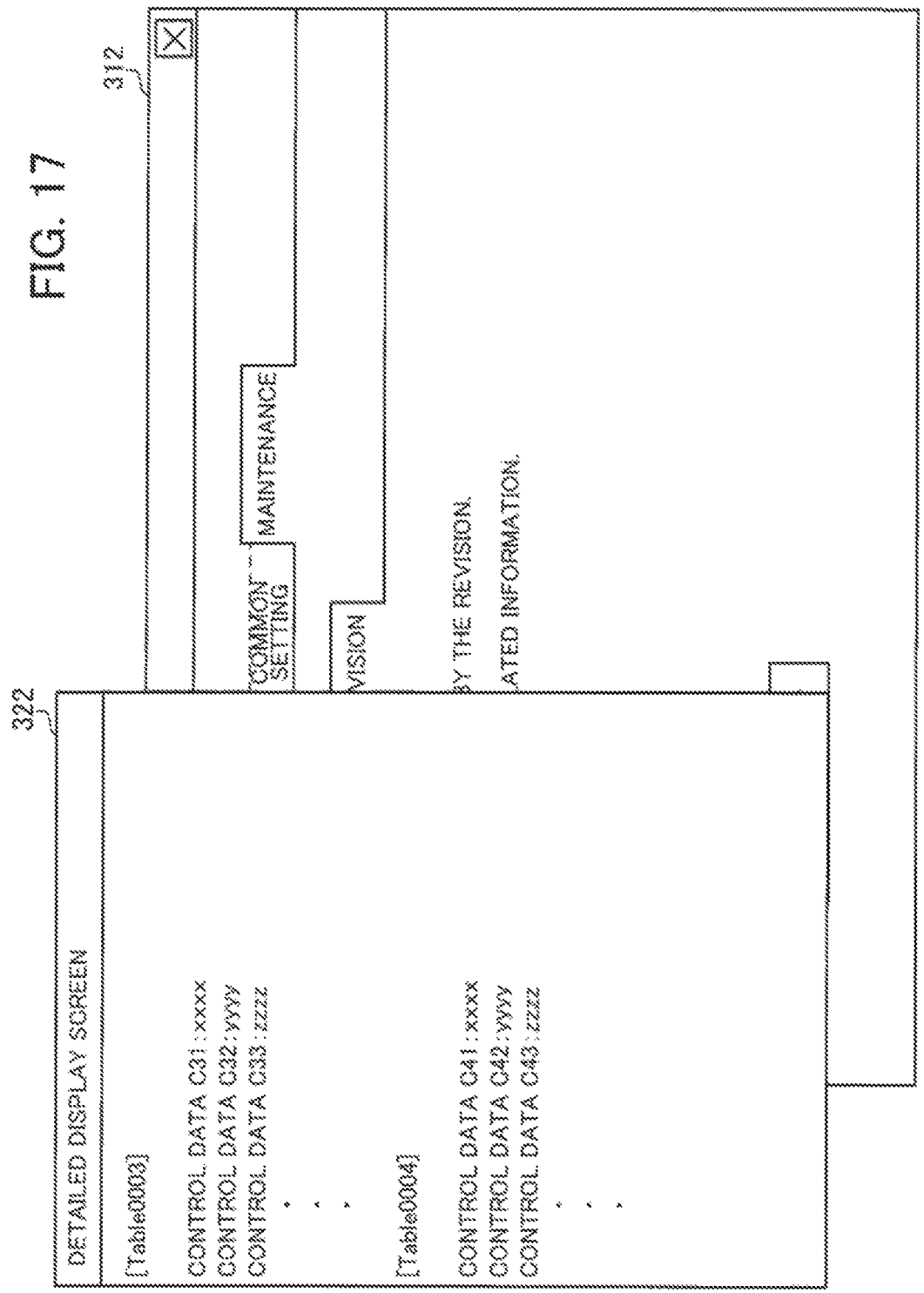
FIG. 17 illustrates an example of a detailed display screen displayed at the time of a revision process being performed.

FIG. 17 illustrates an example of a detailed display screen displayed at the time of a revision process being performed.

The detail setting processing section 321 makes the monitor 304a display a detailed display screen 322 and display a list of the control data and the control data item names received from the detail setting interface section 432 on the detailed display screen 322. As illustrated in FIG. 17, the detailed display screen 322 and, for example, a simplified display screen 312 overlap and the detailed display screen 322 is displayed on the simplified display screen 312.

For example, control data displayed on the detailed display screen 322 is changed according to operation by the manager. As a result, the changed control data is sent to the detail setting interface section 432 of the CM 110a. The detail setting interface section 432 informs the read and setting control section 412 of the received control data and makes a requests to update the control data table 500. The detail setting processing section 321 may make the monitor 304a display, for example, another setting dedicated screen in a state in which the detailed display screen 322 is displayed, and make a request via the displayed setting dedicated screen to update the control data table 500.

For example, the manager sees or changes control data via the detailed display screen 322. After that, for example, the manager terminates the execution of the detail setting program 320. When the Web browse processing section 311 detects that the execution of the detail setting program 320 is terminated, the Web browse processing section 311 sends the GUI processing section 431 of the CM 110a notice to that effect.

For example, the GUI processing section 431 which receives the notice sends the Web browse processing section 311 determined screen information 600 and makes the Web browse processing section 311 display a simplified display screen on which the selection buttons for selecting continuing or terminating the revision process are displayed. If continuing the revision process is selected on the simplified display screen, then the GUI processing section 431 informs the control data table extraction section 416 that the process of displaying the detailed display screen is terminated. The control data table extraction section 416 which is informed that the process of displaying a detailed display screen is terminated requests the revision processing section 413 to begin a revision process.

Figure 18:
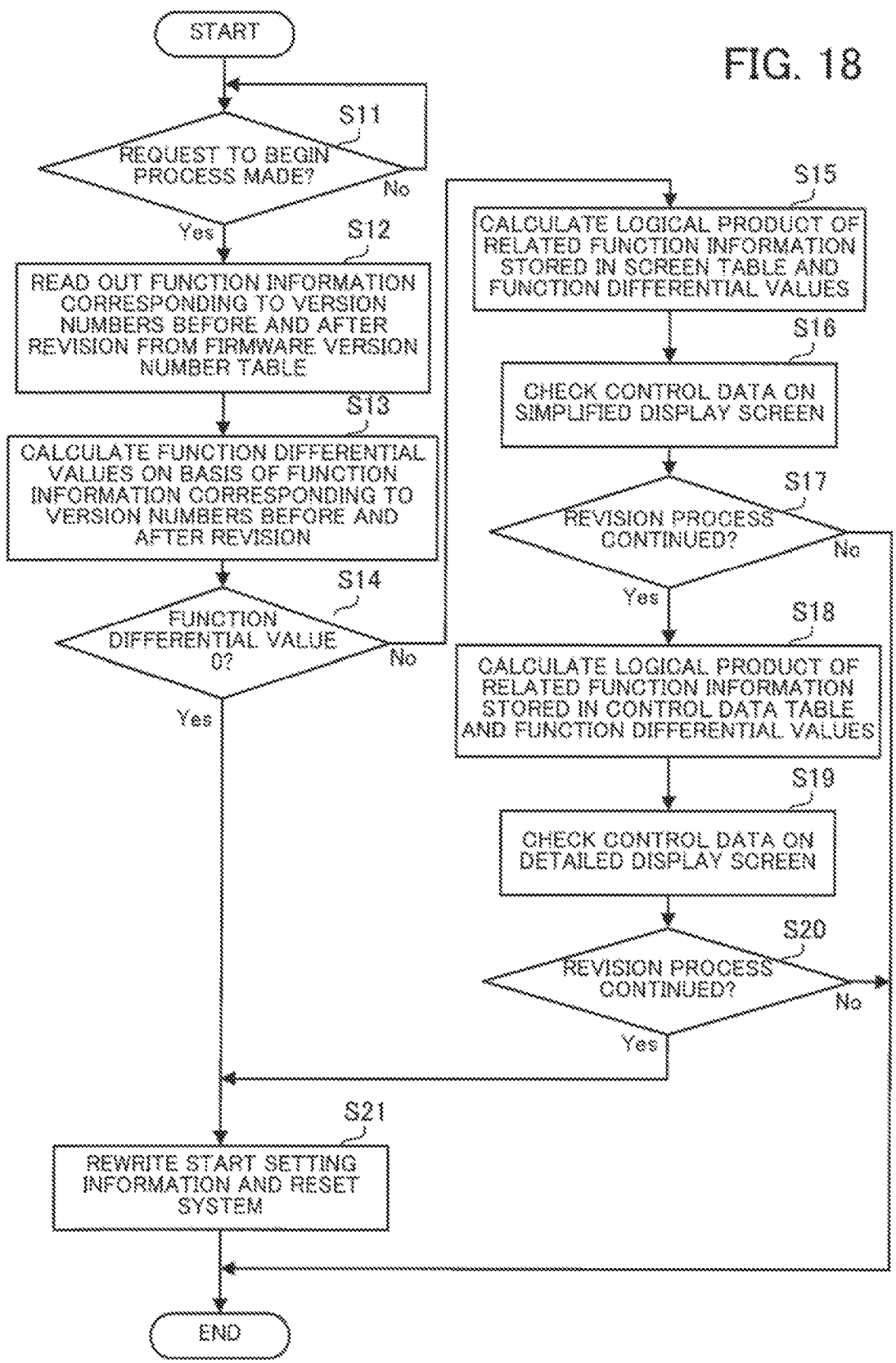
FIG. 18 is a flow chart of a procedure for a revision process by the CM.

A procedure for the above-mentioned revision process will now be described by the use of a flow chart. FIG. 18 is a flow chart of a procedure for the revision process by the CM.

(Step S11) The GUI processing section 431 of the CM 110a waits for a request to begin a revision process in a state in which the GUI processing section 431 has made the management terminal 300 display the simplified display screen illustrated in FIG. 8. When the Start Revision button 654 is clicked on the simplified display screen, the Web browse processing section 311 of the management terminal 300 requests the GUI processing section 431 to begin a revision process. At this time the Web browse processing section 311 sends the GUI processing section 431 identification information indicative of a version number selected on the simplified display screen.

(Step S12) When the GUI processing section 431 receives the request from the management terminal 300 to begin a revision process, the GUI processing section 431 makes the function determination section 414 begin a process. The function determination section 414 reads out function information 442 corresponding to the version number after the revision sent from the management terminal 300 and function information 442 corresponding to a version number before the revision from the firmware version number table 440.

(Step S13) The function determination section 414 calculates the bitwise logical product of the function information 442 corresponding to the version number before the revision and inverted information obtained by inverting the function information 442 corresponding to the version number after the revision, and outputs operation results as function differential values 443.

(Step S14) If all bits of the function differential values 443 calculated are "0," then the determination that there is no processing function which is not supported after the revision process is made and step S21 is performed. On the other hand, if, of the bits of the function differential values 443, there is at least one bit the value of which is "1," then the determination that there is a processing function which is not supported after the revision process is made and step S15 is performed.

(Step S15) The function determination section 414 makes the screen extraction section 415 begin a process. The screen extraction section 415 reads out related function information 452 in order from the screen table 450 and calculates the bitwise logical product of the related function information 452 read out and the function differential values 443 calculated in step S13.

(Step S16) The screen extraction section 415 specifies related function information 452 for which the result of calculating the logical product in step S15 is not "0," and acquires screen identification information 451 corresponding to the specified related function information 452 from the screen table 450. Screen information 600 corresponding to the acquired screen identification information 451 corresponds to a simplified display screen on which control data related to the processing function specified by the function differential values 443 is displayed.

The screen extraction section 415 informs the GUI processing section 431 of the acquired screen identification information 451. The GUI processing section 431 makes the management terminal 300 display a warning image or the like which prompts the manager to see a simplified display screen corresponding to the screen identification information 451 of which the GUI processing section 431 is informed.

The GUI processing section 431 first makes the management terminal 300 display, for example, a simplified display screen like that illustrated in FIG. 14. After that, for example, a tab indicated by a warning image is selected on the simplified display screen. As a result, the GUI processing section 431 outputs necessary screen information 600 to the management terminal 300 to make it display a simplified display screen on which control data is displayed. In addition, when a request to change control data is made via the simplified display screen, the GUI processing section 431 updates a control data table 500 via the read and setting control section 412.

(Step S17) After the manager finishes checking the control data via the simplified display screen, the manager performs operation for selecting continuing or terminating the revision process on, for example, the simplified display screen illustrated in FIG. 14. If the manager selects continuing the revision process, the manager clicks the Checked button 656 and then step S18 is performed. On the other hand, if the manager selects terminating the revision process, then the manager clicks the Cancel button 657. In this case, the GUI processing section 431 terminates the revision process by the CM 110a.

The Web browse processing section 311 of the management terminal 300 sends the GUI processing section 431 of the CM 110a information corresponding to operation input provided by the manager. If the GUI processing section 431 receives a request to terminate the revision process, then the GUI processing section 431 terminates the revision process. On the other hand, if the GUI processing section 431 receives a request to continue the revision process, then step S18 is performed.

If the manager selects continuing the revision process in step S17, the manager may select starting the detail setting program 320 or performing an actual revision process without starting the detail setting program 320 on the simplified display screen. If a request to start the detail setting program 320 is made, then step S18 is performed. On the other hand, if a request to perform an actual revision process is made, then step S21 is performed.

(Step S18) The GUI processing section 431 which receives the request to continue the revision process informs the screen extraction section 415 that the process is completed. The screen extraction section 415 which is informed that the process is completed makes the control data table extraction section 416 begin a process.

The control data table extraction section 416 reads out in order related function information 501 recorded in each control data table 500 and calculates the bitwise logical product of the related function information 501 read out and the function differential value 443 calculated in step S13.

(Step S19) The control data table extraction section 416 specifies a control data table 500 for which the result of calculating the logical product in step S18 is not "0," and acquires identification information for the specified control data table 500. The control data table extraction section 416 requests the Web browse processing section 311 of the management terminal 300 via the GUI processing section 431 to start the detail setting program 320. In addition, the control data table extraction section 416 informs the read and setting control section 412 of the acquired identification information and requests it to display a detailed display screen.

The read and setting control section 412 which is requested to display a detailed display screen read out all control data from the control data table 500 corresponding to the identification information of which the read and setting control section 412 is informed. The read and setting control section 412 sends the control data read out and corresponding control data item names to the detail setting processing section 321 of the management terminal 300 via the detail setting interface section 432 and requests it to display the control data sent on a detailed display screen.

A detailed display screen like that illustrated in FIG. 17 is displayed on the management terminal 300 and a list of the control data and the corresponding control data item names is displayed on this detailed display screen. The manager checks the contents of the list. Furthermore, the manager changes control data at need.

(Step S20) After the manager finishes checking the control data via the detailed display screen, the manager terminates the execution of the detail setting program 320. When the Web browse processing section 311 detects that the execution of the detail setting program 320 is terminated, the Web browse processing section 311 sends the GUI processing section 431 of the CM 110a notice to that effect.

For example, the GUI processing section 431 which receives the notice sends the Web browse processing section 311 the determined screen information 600 and makes the Web browse processing section 311 display the simplified display screen on which the selection buttons for selecting continuing or terminating the revision process are displayed. If continuing the revision process is selected on the simplified display screen, then the GUI processing section 431 informs the control data table extraction section 416 that the process of displaying the detailed display screen is terminated. The control data table extraction section 416 which is informed that the process of displaying the detailed display screen is terminated requests the revision processing section 413 to begin a revision process. After that, step S21 is performed. On the other hand, if terminating the revision process is selected, then the GUI processing section 431 terminates the revision process.

(Step S21) The revision processing section 413 rewrites the start setting information 460 and then resets the system. When the CM 110a is restarted, the start control program 420 is executed and the old-version RAID firmware 410b is executed on the basis of the start setting information 460.

If the determination that, of the bits of the function differential values 443, there is a bit the value of which is not "0" is made in step S14 of the above procedure, then the screen extraction section 415 is made to begin a process next. Alternatively, however, the control data table extraction section 416 may be made to begin a process. In this case, the control data table extraction section 416 performs a process corresponding to steps S18 through S20. If the manager makes a request in step S20 to continue the revision process, then a process is performed by the screen extraction section 415. In addition, the screen extraction section 415 performs a process corresponding to steps S15 through S17. If the manager makes a request in step S17 to continue the revision process, then step S21 is performed.

Furthermore, if the determination that, of the bits of the function differential values 443, there is a bit the value of which is not "0" is made in step S14, which of the screen extraction section 415 and the control data table extraction section 416 performs a process may be determined by operation input provided by the manager.

When a request to perform a downward revision process is made to the above RAID device 100, whether there is a processing function which is not supported after the revision is determined automatically. If there is a processing function which is not supported after the revision, then the downward revision process is stopped temporarily and the process of prompting the manager via a screen to check control data related to the processing function is performed.

If there is a processing function which is not supported after the revision, the case where firmware after the revision cannot be executed normally may occur. The reason for this is, for example, that control data unique to the processing function remains in a control data table 500. With the above RAID device 100 the manager is prompted to check control data. This can prevent such a problem from arising.

Furthermore, with the RAID device 100 control data which may be related to a processing function that is not supported after the revision is narrowed down automatically. Information for guiding the manager to a simplified display screen on which control data narrowed down is displayed is indicated or a detailed display screen on which a list of control data narrowed down is displayed is displayed for the manager. This reduces the load on the manager who performs work for specifying this control data. In addition, the manager can easily specify necessary control data regardless of his/her skill. Furthermore, information for guiding the manager to a screen on which the control data narrowed down is changed can be indicated. Accordingly, the load on the manager can be reduced further.

Moreover, the process of specifying control data related to a processing function which is not supported after the revision is performed by the use of information (function information 442, function differential values 443, and related function information 452 and 501) in which a processing function is associated with each bit. Therefore, efficiency in the process of specifying control data is enhanced and a processing speed is increased.

For example, the function determination section 414 calculates the exclusive-OR of function information 442 before the revision and function information 442 after the revision. By doing so, a processing function which is not supported after the revision can be specified. In addition, the screen extraction section 415 or the control data table extraction section 416 calculates the logical product of function differential values 443 and related function information 452 or 501. By doing so, target screen information 600 or a target control data table 500 can be specified. The function information 442, the function differential values 443, and the related function information 452 and 501 which are bit strings are used in this way. As a result, target information can be specified by logical operations and a processing procedure is simplified.

In this embodiment only a downward revision is performed. For example, however, it may be possible to perform not only a downward revision but also revising RAID firmware to new-version RAID firmware (referred to as an upward revision). In the case of an upward revision, the process indicated in FIG. 18 is also performed. If there is a processing function which is not supported after the revision, then the value of a corresponding bit of function differential values 443 becomes "1." This is the same with a downward revision. As a result, the process from step S15 is performed.

If the guarantee that all processing functions supported by old-version RAID firmware are supported by new-version RAID firmware is given, then the following process may be performed. A request to begin a revision process is made in step S11 of FIG. 18. If the function determination section 414 determines that a downward revision is performed, then step S12 is performed. The function determination section 414 compares a version number of the RAID firmware after the revision of which the management terminal 300 informs the function determination section 414 and a version number of the RAID firmware 410a before the revision and determines whether a downward revision is performed. If a downward revision is performed, then step S12 is performed. In this case, the bitwise exclusive-OR of function information 442 corresponding to the version number before the revision and function information 442 corresponding to the version number after the revision may be calculated in step S13 to obtain function differential values 443. If a downward revision is not performed, then steps S13 and S14 are skipped and step S21 is performed.

Concrete examples of a processing function supported by the RAID firmware, a simplified display screen displayed at the time of performing a revision process, and a control data table extracted at the time of performing a revision process will now be described. A control function at RAID level 5 (hereinafter referred to as the "RAID level 5 function"), an encryption function, and a copy area expansion function will be taken as processing functions which may not be supported depending on the version number of the RAID firmware.

In the descriptions of these processing functions, a HDD (corresponding to the HDD 131a or 131b or the like) which is a storage unit connected to the CM 110a for realizing a physical storage area will be represented as a "HDD 131." IT is assumed that a plurality of HDDs 131 are connected to the CM 110a.

(1) RAID Level 5 Function

The RAID level 5 function is realized by the RAID control section 411 in the following way. The RAID control section 411 divides data to be recorded into a plurality of blocks. These blocks are distributed and stored in HDDs 131. Parity data based on the blocks distributed and stored is stored in a HDD 131 other than the HDDs 131 in which the blocks are stored. At this time a dedicated HDD 131 is not assigned for storing all the parity data. That is to say, the blocks obtained by dividing the data to be recorded and the parity data are stored in different HDDs 131 and the parity data itself is also distributed and stored.

It is assumed that the RAID level 5 function is supported by the RAID firmware 410a before the revision and that the RAID level 5 function is not supported by the RAID firmware 410b after the revision. In this case, when the CM 110a is requested to perform a revision process, a simplified display screen which is the same as that illustrated in FIG. 14 is displayed first on the monitor 304a of the management terminal 300.

In this case, the screen extraction section 415 performs a process to extract screens corresponding to lower layers for, for example, the state display tab 620 and the volume setting tab 630. As a result, as illustrated in FIG. 14, the warning images 661 and 662 are displayed and are associated with the state display tab 620 and the volume setting tab 630 respectively.

Figure 19:
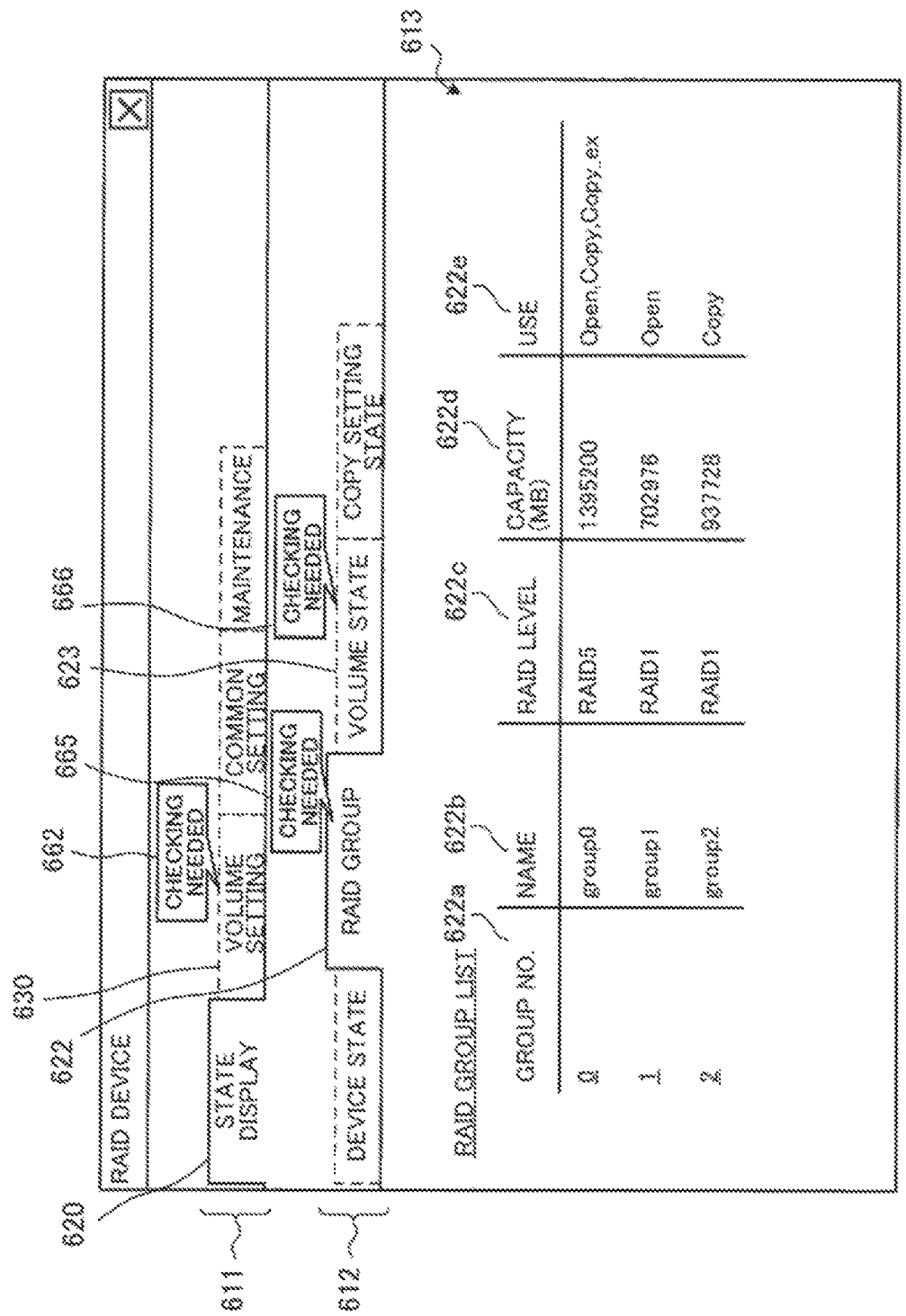
FIG. 19 illustrates an example of a simplified display screen displayed in the case of a state display tab and a RAID group tab being selected.

If the state display tab 620 is selected by operation by the manager, a simplified display screen like that illustrated in FIG. 19 is displayed. FIG. 19 illustrates an example of a simplified display screen displayed in the case of the state display tab and the RAID group tab being selected.

If the state display tab 620 is selected, warning images 665 and 666 are displayed in the tab selection area 612 and are associated with the RAID group tab 622 and the volume state tab 623, respectively, as illustrated in FIG. 19. In this case, screen information 600 extracted by the screen extraction section 415 is used for displaying simplified display screens corresponding to lower layers for the RAID group tab 622 and the volume state tab 623. The manager is then prompted by the warning images 665 and 666 to check the simplified display screens displayed at the time of selecting the RAID group tab 622 and the volume state tab 623 respectively.

When the RAID group tab 622 is selected, a "RAID Group List" is displayed in the control data display and setting area 613. Control data corresponding to an Identification Number item 622a, a Name item 622b, a RAID Level item 622c, a Capacity item 622d, and a Use item 622e for each RAID group is displayed in the RAID Group List. Of these control data items, the RAID Level item 622c is related to the RAID level 5 function.

Therefore, the manager selects the RAID group tab 622 in accordance with the warning image 665. By doing so, the manager can check the RAID Level item 622c. If "RAID level 5" is set in the RAID Level item 622c, then the manager selects, for example, the volume setting tab 630 in accordance with the warning image 662. By doing so, the manager performs operation for making a change.

Figure 20:
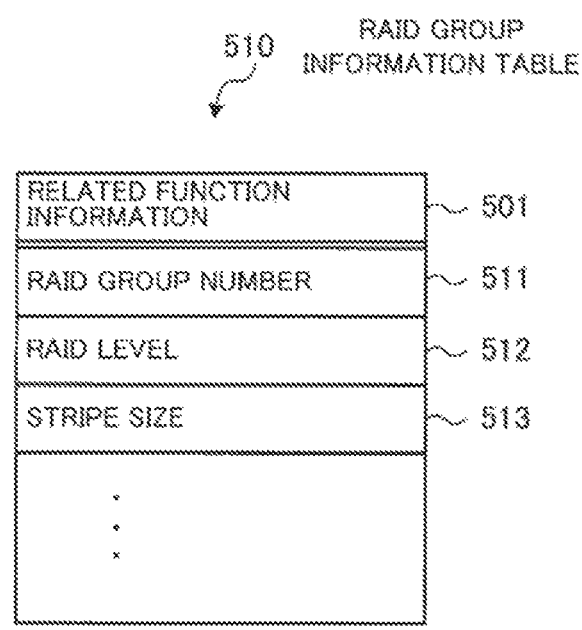
FIG. 20 illustrates an example of information recorded in a RAID group information table.

On the other hand, it is assumed that the control data table extraction section 416 extracts a RAID group information table illustrated in FIG. 20 as one of control data tables 500 related to the RAID level 5 function.

FIG. 20 illustrates an example of information recorded in the RAID group information table.

Control data related to a RAID group is recorded in a RAID group information table 510. The RAID group information table 510 is prepared for each RAID group set by the CM 110a. In addition to the above related function information 501, as indicated in FIG. 20, control data regarding a RAID Group Number item 511, a RAID Level item 512, a Stripe Size item 513, and the like is recorded in the RAID group information table 510. The size of groups into which data is divided is set in the Stripe Size item 513.

When the control data table extraction section 416 extracts information for identifying the RAID group information table 510, all control data, excluding the related function information 501, in the RAID group information table 510 is displayed on a detailed display screen on the management terminal 300.

If a simplified display screen like that illustrated in FIG. 19 is displayed, then the GUI processing section 431 reads information set in, for example, the RAID Group Number item 511 and the RAID Level item 512 as control data from the RAID group information table 510. The GUI processing section 431 then edits screen information 600 and sends it to the Web browse processing section 311 so that the read information set in the RAID Group Number item 511 and the RAID Level item 512 will be displayed in the Identification Number item 622a and the RAID Level item 622c respectively.

For example, it is assumed that the process of revising the RAID firmware to RAID firmware which does not support the RAID level 5 function is performed in a state in which "RAID level 5" is set in the RAID Level item 512 of the RAID group information table 510. When the RAID firmware is executed after the revision process, "RAID level 5" set in the RAID Level item 512 is referred to. However, it is impossible to recognize this set value. As a result, an abnormality may occur in a process. Accordingly, the manager changes the value set in the RAID Level item 512 to a RAID level supported by the RAID firmware after the revision. Alternatively, the manager performs setting change operation such as deleting a RAID group for which "RAID level 5" is set. For example, if "RAID level 5" is set in the RAID Level item 622c on the simplified display screen illustrated in FIG. 19, then the manager selects the volume setting tab 630 in accordance with the warning image 662 and performs operation for making the above change in setting.

(2) Encryption Function

An encryption function is a function for encrypting data recorded in a volume. In this embodiment it is assumed that whether to encrypt recorded data can be set according to volumes. When the RAID control section 411 records data in a volume, the RAID control section 411 refers to a control data table 500. If the encryption function is set for the volume in which the data is to be recorded, then the RAID control section 411 encrypts the data and records it in the volume.

Figure 21:
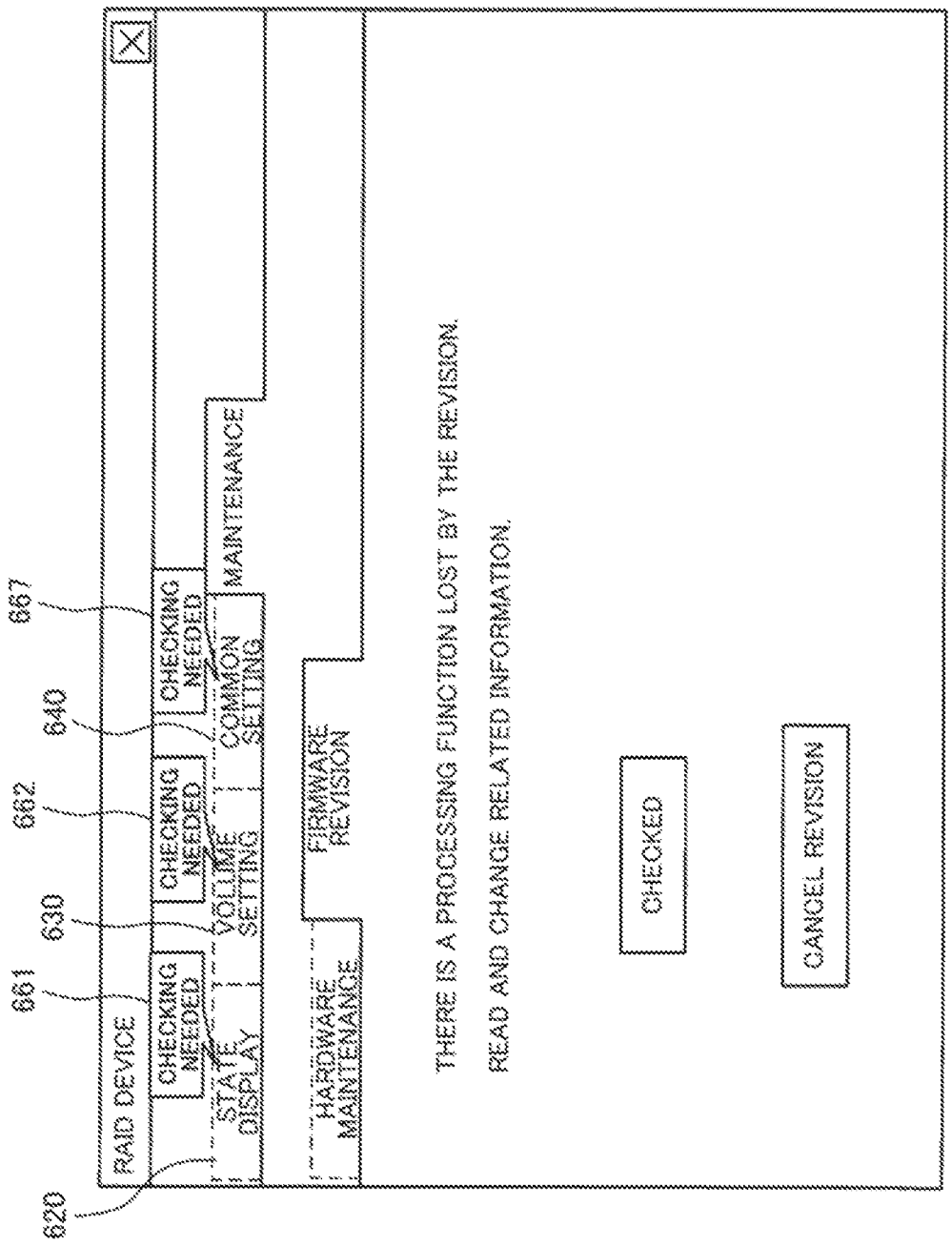
FIG. 21 illustrates an example of a simplified display screen displayed in the case of an encryption function being extracted as a processing function which is not supported after revision.

FIG. 21 illustrates an example of a simplified display screen displayed in the case of the encryption function being extracted as a processing function which is not supported after revision.

If the encryption function is extracted by the function determination section 414 as a processing function which is not supported after revision, a simplified display screen like that illustrated in FIG. 21, for example, is displayed on the monitor 304a of the management terminal 300. The simplified display screen illustrated in FIG. 21 is obtained by adding a warning image 667 to the simplified display screen illustrated in FIG. 14.

The warning images 661, 662, and 667 are displayed and are associated with the state display tab 620, the volume setting tab 630, and the common setting tab 640 respectively. In this case, screen information 600 extracted by the screen extraction section 415 is used for displaying simplified display screens corresponding to lower layers for the state display tab 620, the volume setting tab 630, and the common setting tab 640. The manager is then prompted by the warning images 661, 662, and 667 to check the simplified display screens displayed at the time of selecting the state display tab 620, the volume setting tab 630, and the common setting tab 640 respectively.

Figure 22:
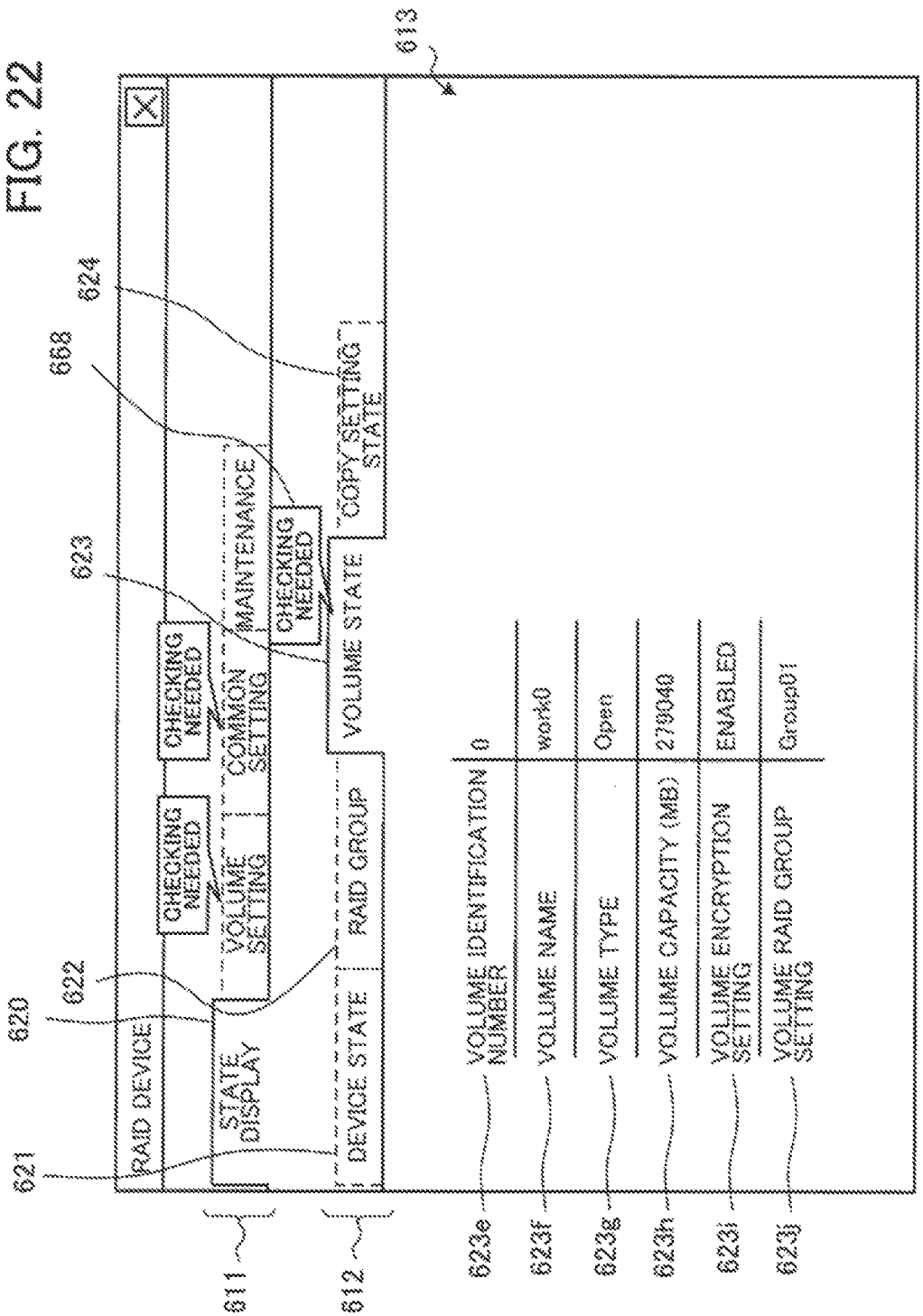
FIG. 22 illustrates an example of a simplified display screen displayed in the case of the state display tab and a volume state tab being selected.

FIG. 22 illustrates an example of a simplified display screen displayed in the case of the state display tab and the volume state tab being selected.

It is assumed that the state display tab 620, for example, is selected in a state in which the simplified display screen illustrated in FIG. 21 is displayed. As illustrated in FIG. 22, the device state tab 621, the RAID group tab 622, the volume state tab 623, and the copy setting state tab 624 are displayed in the tab selection area 612. A warning image 668 is displayed and is associated with the volume state tab 623. In this case, screen information 600 extracted by the screen extraction section 415 is used for displaying a simplified display screen corresponding to a lower layer for the volume state tab 623. The manager is then prompted by the warning image 668 to check the simplified display screen displayed at the time of selecting the volume state tab 623.

The volume list indicated in FIG. 15 is displayed in the control data display and setting area 613 in an initial state in which the volume state tab 623 is selected. When one is selected from the Identification Number item 623a of the volume list, volume detailed information indicated in FIG. 22 is displayed in the control data display and setting area 613. Control data corresponding to a Volume Identification Number item 623e, a Volume Name item 623f, a Volume Type item 623g, a Volume Capacity item 623h, a Volume Encryption Setting item 623i, and a Volume RAID Group Setting item 623j is displayed as the volume detailed information. Of this control data, the control data corresponding to the Volume Encryption Setting item 623i indicates whether to encrypt data recorded in a volume, and is related to the encryption function. Therefore, the manager can check the Volume Encryption Setting item 623i by selecting the volume state tab 623 in accordance with the warning image 668.

Figure 23:
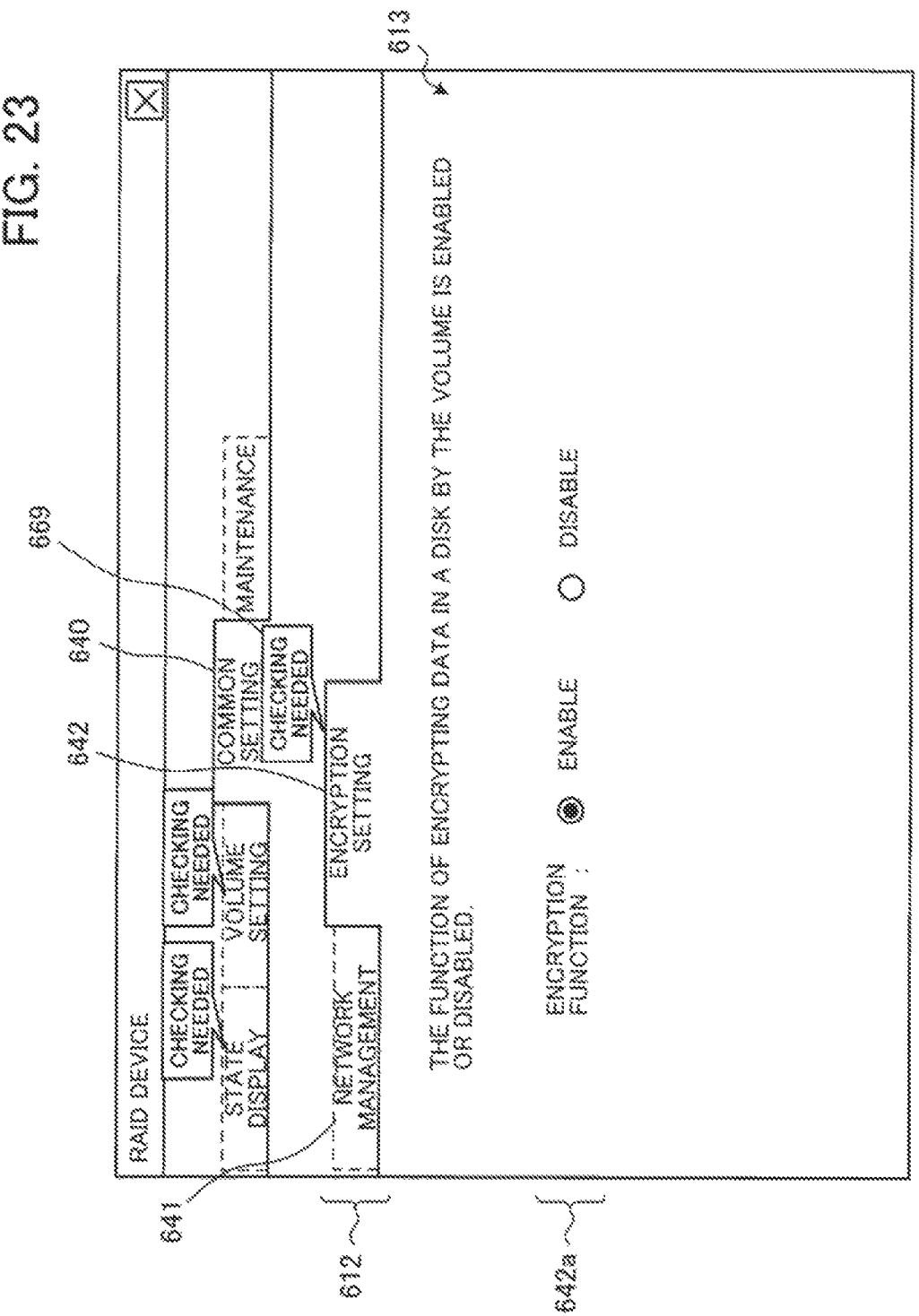
FIG. 23 illustrates an example of a simplified display screen displayed in the case of a common setting tab being selected.

FIG. 23 illustrates an example of a simplified display screen displayed in the case of the common setting tab being selected.

It is assumed that the common setting tab 640 is selected in a state in which the simplified display screen illustrated in FIG. 21 or 22 is displayed. As illustrated in FIG. 23, a network management tab 641 and an encryption setting tab 642 are displayed in the tab selection area 612. In addition, a warning image 669 is displayed and is associated with the encryption setting tab 642. In this case, screen information 600 extracted by the screen extraction section 415 is used for displaying a simplified display screen corresponding to a lower layer for the encryption setting tab 642. The manager is then prompted by the warning image 669 to check the simplified display screen displayed at the time of selecting the encryption setting tab 642.

When the encryption setting tab 642 is selected, a selection area 642a illustrated in FIG. 23 is displayed in the control data display and setting area 613. Whether to enable or disable the encryption function for the whole of a storage area managed by the CM 110*a* is determined by a radio button in the selection area 642*a*. The manager selects the encryption setting tab 642 in accordance with the warning image 669 on the simplified display screen illustrated in FIG. 23. By doing so, the manager can perform setting operation for the encryption function in the selection area 642*a* displayed.

Figure 24:
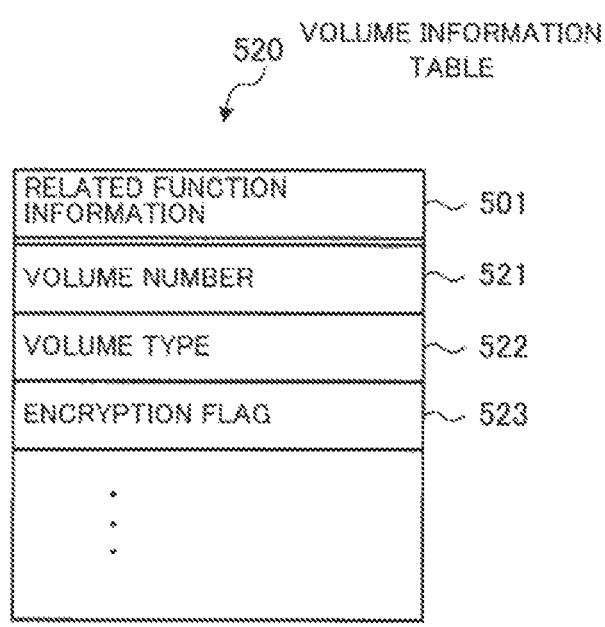
FIG. 24 illustrates an example of information recorded in a volume information table.
Figure 25:
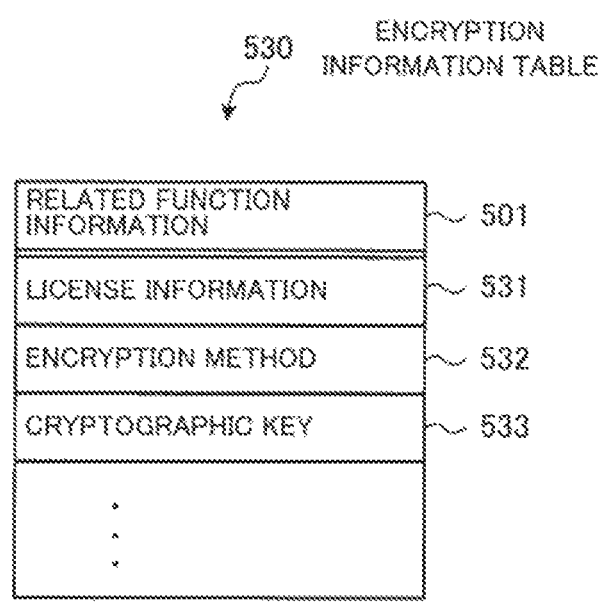
FIG. 25 illustrates an example of information recorded in an encryption information table.

On the other hand, it is assumed that the control data table extraction section 416 extracts a volume information table illustrated in FIG. 24 and an encryption information table illustrated in FIG. 25 as control data tables 500 related to the encryption function.

FIG. 24 illustrates an example of information recorded in a volume information table.

Control data related to volume setting is recorded in a volume information table 520. The volume information table 520 is prepared for each volume set by the CM 110*a*. In addition to the above related function information 501, as indicated in FIG. 24, control data regarding a Volume Number item 521, a Volume Type item 522, an Encryption Flag item 523, and the like is recorded in the volume information table 520. Control data set in the Volume Number item 521, the Volume Type item 522, and the Encryption Flag item 523 is information displayed in, for example, the Volume Identification Number item 623*e*, the Volume Type item 623*g*, and the Volume Encryption Setting item 623*i*, respectively, on the simplified display screen illustrated in FIG. 22.

Data recorded in a volume may remain encrypted. If the firmware after the revision does not support the encryption function, the data recorded in this volume cannot be read out normally at the time of executing the firmware after the revision. Accordingly, for example, the manager changes a value set in the Encryption Flag item 523 of the volume information table 520 to a value which is indicative that the encryption function is disabled, and puts the data recorded in the volume into an unencrypted state.

If disabling the encryption function, for example, is selected in the selection area 642*a* on the simplified display screen illustrated in FIG. 23, a value which is indicative that the encryption function is disabled is set in the Encryption Flag items 523 of the volume information tables 520 for all volumes. At this time the read and setting control section 412 updates the Encryption Flag item 523 in response to a request from the GUI processing section 431. In addition, the read and setting control section 412 requests the RAID control section 411 to decode data recorded in the volumes corresponding to the volume information tables 520 in which the Encryption Flag item 523 is updated so as to indicate that the encryption function is disabled, and to update the volumes.

If the screen information 600 used for displaying the simplified display screen illustrated in FIG. 23 is extracted by the screen extraction section 415, then the GUI processing section 431 reads out a set value in the Encryption Flag item 523 from, for example, all the volume information tables 520. If at least one of the set values in the Encryption Flag items read out indicates that the encryption function is enabled, then the GUI processing section 431 makes the management terminal 300 perform a display which indicates that the encryption function is enabled in the selection area 642*a* on the simplified display screen.

FIG. 25 illustrates an example of information recorded in an encryption information table.

Control data regarding the encryption function for the whole of the storage area managed by the CM 110*a* is recorded in an encryption information table 530. In addition to the related function information 501, as indicated in FIG. 25, control data regarding a License Information item 531, an Encryption Method item 532, an Cryptographic Key item 533, and the like is recorded in the encryption information table 530. Information for identifying a certificate used at the time of performing an encryption process is set in the License Information item 531. Information indicative of a method for an encryption process is set in the Encryption Method item 532. Key information used at the time of performing an encryption process is set in the Cryptographic Key item 533.

Control data set in the License Information item 531, the Encryption Method item 532, and the Cryptographic Key item 533 is selected so that the encryption function will be disabled on the simplified display screen illustrated in FIG. 23. When the RAID control section 411 decodes encrypted data, the RAID control section 411 refers to this control data. After the decoding of the data is completed, the RAID control section 411 may delete the control data set in the License Information item 531, the Encryption Method item 532, and the Cryptographic Key item 533. After the data is decoded and the process of revising the RAID firmware is performed, the RAID firmware after the revision is executed. If the above control data is not referred to at this time, the control data may not be deleted. That is to say, this control data may be left as it is.

All control data, excluding the related function information 501, in the volume information table 520 and the encryption information table 530, together with the corresponding control data item names, is displayed on a detailed display screen on the management terminal 300. As described above, the volume information table 520 is prepared for each volume. Accordingly, when the control data table extraction section 416 extracts the volume information tables 520, a list of the contents of the volume information tables 520 for all the volumes is displayed on the detailed display screen.

(3) Copy Area Expansion Function

A copy area extension function is a processing function which makes it possible to dynamically expand, at the time of copying a volume to a determined storage area, the copy destination storage area. If a volume is used as an expanded area of a copy destination, setting is performed in, for example, the Volume Type item 522 of the volume information table 520 illustrated in FIG. 24 so that a volume will be used as an expanded area.

Therefore, if the copy area extension function is extracted as a processing function which is not supported after the revision, then the control data table extraction section 416 extracts a volume information table 520 as one of control data tables 500 related to the copy area extension function.

Figure 26:
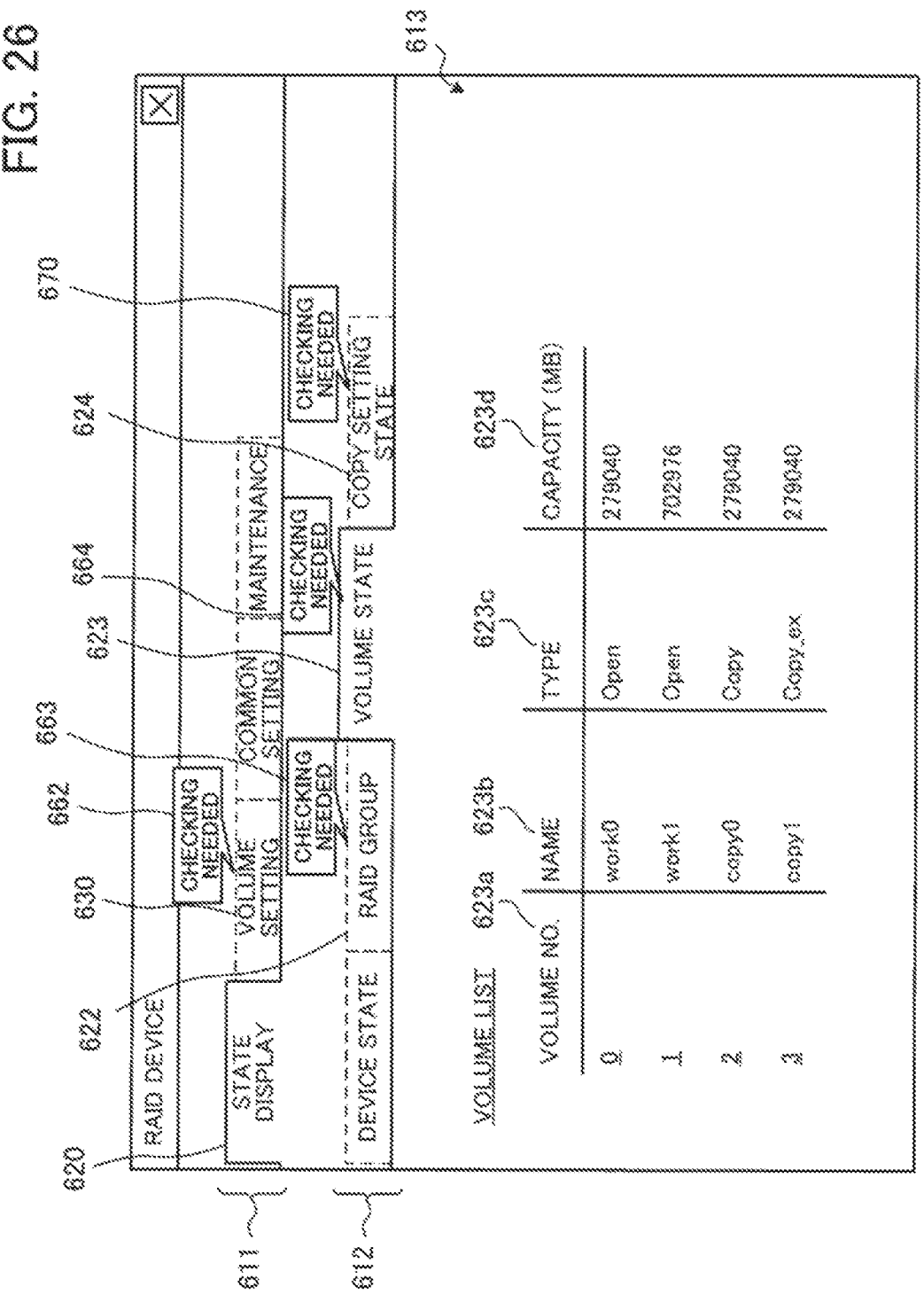
FIG. 26 illustrates an example of a simplified display screen displayed in the case of a copy area expansion function being extracted as a processing function which is not supported after the revision.

FIG. 26 illustrates an example of a simplified display screen displayed in the case of the copy area expansion function being extracted as a processing function which is not supported after the revision.

Control data set in the Volume Type item 522 of the volume information table 520 is read out as the Type 623*c* displayed on the simplified display screen illustrated in FIG. 15, the Use item 622*e* displayed on the simplified display screen illustrated in FIG. 19, or the like. Accordingly, if the copy area expansion function is extracted as a processing function which is not supported after the revision, the warning image 661 associated with, for example, the state display tab 620 in the tab selection area 611 is displayed on a first simplified display screen (see FIG. 14). In addition, a use for a volume is changed by selecting the volume setting tab 630, so the warning image 662 associated with the volume setting tab 630 in the tab selection area 611 is displayed (see FIG. 14).

Furthermore, if the state display tab 620 is selected in this state, then the warning images 663 and 664 associated with, for example, the RAID group tab 622 and the volume state tab 623, respectively, are displayed in the tab selection area 612 as illustrated in FIG. 26. If the copy setting state tab 624 is selected, control data regarding volume copy including the copy area extension function is displayed in the control data display and setting area 613 (not illustrated). Therefore, a warning image 670 associated with the copy setting state tab 624 is displayed in the tab selection area 612.

If the copy area expansion function is not supported by the RAID firmware after the revision, then the manager sees, for example, the simplified display screen illustrated in FIG. 26 and checks a value of the Type 623c set for each volume. If "Copy_ex" is set in the Type 623c, then setting is performed in the Volume Type item 522 of a corresponding volume information table 520 so that the volume will be used as an expanded area of a volume copy destination. When the RAID firmware is executed after the revision process, a value set in the Volume Type item 522 is referred to. In this case, however, it is impossible to recognize this value. As a result, an abnormality may occur in the process.

Accordingly, the manager sees, for example, a simplified display screen for volume setting corresponding to a lower layer for the volume setting tab 630. The manager then makes a change in setting. For example, the manager changes a use for the volume to a use other than an expanded area of a volume copy destination or deletes the volume a use for which is set to an expanded area of a volume copy destination.

As described above, when the manager performs operation for changing control data in a state in which a simplified display screen or a detailed display screen is displayed on the management terminal 300, the RAID control section 411 of the CM 110a performs a setting change process. The contents of the setting change process depend on control data changed. In some cases, the setting change process terminates in a short time. In other cases, however, the setting change process requires a comparatively long time. In addition, there are cases where the setting change process cannot be completed depending on control data changed. In this case, it is impossible to continue the revision process.

Figure 27:
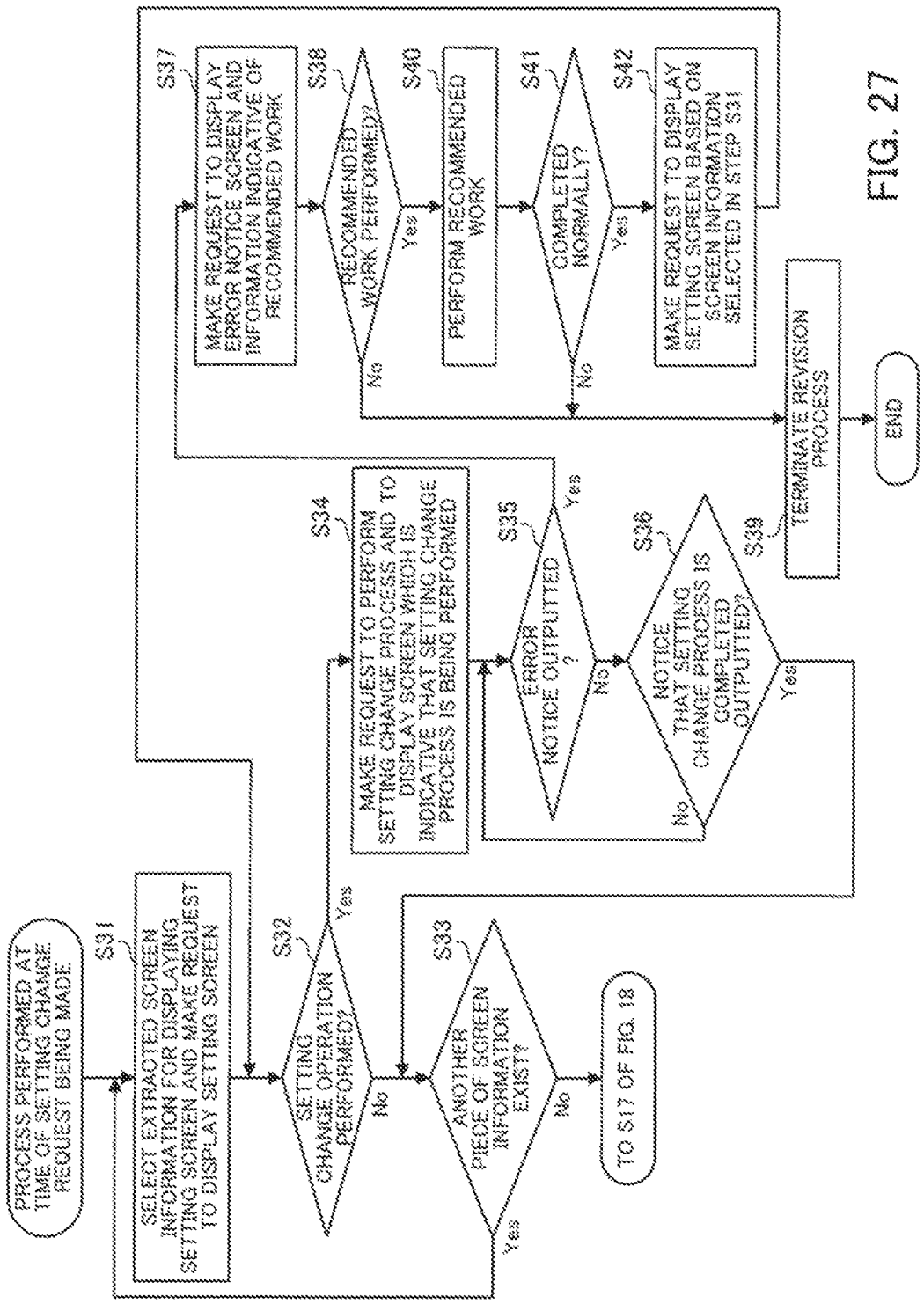
FIG. 27 is a flow chart of an example of a procedure for a process in the CM in the case of a request to change control data being made.

As illustrated in FIG. 27, the GUI processing section 431 may accept the state of the setting change process from the RAID control section 411 via the read and setting control section 412, make the management terminal 300 display a screen corresponding to accepted information, and help the manager to perform work.

FIG. 27 is a flow chart of an example of a procedure for a process in the CM in the case of a request to change control data being made. In FIG. 27, the case where a change is made via a simplified display screen will be taken as an example. For example, when operation for selecting the volume setting tab 630 with which the warning image 662 is associated (see FIG. 14 or 15, for example) or the common setting tab 640 with which the warning image 667 is associated (see FIG. 21, 22, or 23, for example) is performed in a state in which a simplified display screen including warning images is displayed in step S16 of FIG. 18, a process illustrated in FIG. 27 is begun.

(Step S31) The GUI processing section 431 selects a piece of screen information 600 for displaying a setting screen from one or more pieces of screen information 600 extracted by the screen extraction section 415. The GUI processing section 431 then requests the Web browse processing section 311 of the management terminal 300 to display the setting screen based on the piece of screen information 600 selected. The Web browse processing section 311 displays the setting screen requested on the simplified display screen.

(Step S32) If a request to change control data on the setting screen displayed in step S31 is made by operation input provided by the manager, then the GUI processing section 431 receives changed control data from the Web browse processing section 311. In this case, step S34 is performed next. On the other hand, if operation for changing control data is not performed, then step S33 is performed next. For example, if a Checked button on the setting screen displayed in step S31 is clicked, then step S33 is performed.

(Step S33) The GUI processing section 431 determines whether, of the one or more pieces of screen information 600 for displaying a setting screen extracted by the screen extraction section 415, there are pieces of screen information 600 corresponding to setting screens which have not been checked yet. If there are pieces of screen information 600 corresponding to setting screens which have not been checked yet, then step S31 is performed. The GUI processing section 431 selects one of the pieces of screen information 600 corresponding to the setting screens which have not been checked yet, and requests the management terminal 300 to display a setting screen based on the piece of screen information 600 selected. On the other hand, if there are no pieces of screen information 600 corresponding to setting screens which have not been checked yet, then the process of displaying the simplified display screen terminates and step S17 of FIG. 18 is performed next.

In step S31, the GUI processing section 431 determines on the basis of, for example, a screen identification number for identifying a piece of screen information 600 whether the piece of screen information 600 is information for displaying a setting screen and which tab the setting screen belongs to a lower layer for. When step s31 is performed first, a piece of screen information 600 which belongs to a lower layer for a tab clicked on the simplified display screen is always selected.

Each time step S31 is performed, one piece of screen information 600 is selected. In this selection process pieces of screen information 600 should be selected in order in accordance with priority determined in advance. For example, information indicative of the priority may be associated with screen identification information 451 for each piece of screen information 600, be stored in the screen table 450, and be read out to the GUI processing section 431 by the screen extraction section 415. Alternatively, information indicative of the priority may be prepared as part of data for the maintenance program 430.

Furthermore, each time step S31 is performed, pieces of screen information 600 which belong to a lower layer for a same tab are first selected in order. All the pieces of screen information 600 which belong to the lower layer for the same tab (volume setting tab 630, for example) are selected in this way. After that, whether there are pieces of screen information 600 which belong to a lower layer for a second tab (common setting tab 640, for example) is determined in step S33. If the determination that there are pieces of screen information 600 which belong to the lower layer for the second tab is made in step S33, then these pieces of screen information 600 are selected in order in step S31.

(Step S34) The GUI processing section 431 informs the RAID control section 411 via the read and setting control section 412 of the changed control data and a corresponding control data item. The GUI processing section 431 then requests the RAID control section 411 to change data in a control data table 500 and perform a setting change process corresponding to the changed control data.

The RAID control section 411 which receives the changed control data begins the setting change process. In this setting change process data in the HDD 131 is moved or converted at need. On the other hand, the GUI processing section 431 sends the Web browse processing section 311 screen information 600 for displaying a screen which is indicative that the setting change process is being performed, and requests the Web browse processing section 311 to display the screen based on the screen information 600. The Web browse processing section 311 displays the screen based on the received screen information 600 on the simplified display screen.

(Step S35) If the RAID control section 411 cannot complete the requested setting change process normally, then the RAID control section 411 outputs error notice. The GUI processing section 431 determines whether the RAID control section 411 informs the GUI processing section 431 via the read and setting control section 412 of the occurrence of an error. If the RAID control section 411 informs the GUI processing section 431 of the occurrence of an error, then step S37 is performed. On the other hand, if the RAID control section 411 does not output error notice, then step S36 is performed.

(Step S36) If the RAID control section 411 completes the requested setting change process normally, then the RAID control section 411 outputs notice that the setting change process is completed. The GUI processing section 431 determines whether the RAID control section 411 informs the GUI processing section 431 via the read and setting control section 412 of the completion of the setting change process. If the RAID control section 411 informs the GUI processing section 431 of the completion of the setting change process, then step S33 is performed. On the other hand, if the RAID control section 411 does not output notice that the setting change process is completed, then step S35 is performed again. A loop including steps S35 and S36 is repeated every certain time.

(Step S37) The GUI processing section 431 sends the Web browse processing section 311 screen information 600 for displaying an error notice screen which is indicative that the setting change process cannot be performed, and requests the Web browse processing section 311 to display the error notice screen.

Error information of which the RAID control section 411 informs the GUI processing section 431 in step S35 may include information indicative of work recommended for completing the setting change process. In this case, the GUI processing section 431 makes the Web browse processing section 311 display the information indicative of the work recommended on the error notice screen. The information indicative of the work recommended may include information indicative of a control data item in which a change in setting should be made, information which hints a setting change screen for this control data item, the number of devices to be increased and a device increase procedure, or the like.

(Step S38) A Perform button for performing the work recommended, a Terminate button for terminating the revision process, and the like are displayed on the error notice screen. If the manager clicks the Perform button, then the Web browse processing section 311 sends the GUI processing section 431 notice to that effect and step S40 is performed next. On the other hand, if the manager clicks the Terminate button, then the Web browse processing section 311 sends the GUI processing section 431 notice to that effect and step S39 is performed next. For example, if the work recommended requires stopping the CM 110a itself, then the Terminate button is clicked.

(Step S39) The GUI processing section 431 requests the Web browse processing section 311 to display a screen which is indicative that the revision process is terminated, and terminates the revision process in the CM 110a.

For example, when the GUI processing section 431 receives the error notice from the RAID control section 411 in step S35, the GUI processing section 431 may request the Web browse processing section 311 to display the error notice screen, and make the revision process in the CM 110a terminate automatically. Alternatively, the following method may be adopted. The GUI processing section 431 requests the Web browse processing section 311 to display the error notice screen. After that, a Check button displayed on the error notice screen is clicked. At this time the GUI processing section 431 terminates the revision process in the CM 110a in response to notice of click operation detection from the Web browse processing section 311.

(Step S40) The manager performs the work recommended on the error notice screen. For example, the manager makes the management terminal 300 display a simplified display screen or a detailed display screen and further performs necessary setting change operation for control data. The RAID control section 411 performs a setting change process corresponding to the setting change operation. In addition, the manager increases devices at need and performs setting operation so that the CM 110a can use the devices increased.

When the manager finishes the work, the manager clicks, for example, a button displayed on the monitor 304a of the management terminal 300. By doing so, the GUI processing section 431 is informed of whether the work has been completed normally.

(Step S41) If the GUI processing section 431 is informed that the work has been completed normally by the manager, then step S42 is performed. On the other hand, if the GUI processing section 431 is informed that the work has not been completed normally by the manager, then step S39 is performed.

(Step S42) The GUI processing section 431 sends the Web browse processing section 311 the piece of screen information 600 selected in the last step S31, and requests the Web browse processing section 311 again to display the setting screen based on the piece of screen information 600 sent. After that, step S32 is performed. If a request to change control data on the setting screen displayed is made by operation input provided by the manager, then step S34 is performed. That is to say, the RAID control section 411 performs a setting change process again.

With the above procedure the manager makes a change in setting on a setting screen based on screen information 600 extracted by the screen extraction section 415. If a setting change process cannot be completed, then the revision process may be terminated. In addition, if a setting change process cannot be completed, then information indicative of another work for completing the setting change process may be presented to the manager to help the manager to perform the work. Furthermore, after the work recommended is completed, the setting change process which cannot be performed normally the last time can be performed again.

A RAID level change process will be taken as an example of a setting change process and an example of a procedure for a RAID level change process associated with the steps of FIGS. 18 and 27 will now be described.

A change in RAID level may cause a change in the capacity of a necessary physical storage area, the number of HDDs or SSDs, or the like. Accordingly, there are cases where a RAID level cannot be changed to a desired level, depending on the capacity of a free physical storage area, the number of drives connected, or the like.

For example, if a RAID level is changed from "6" to "5," a parity storage area is reduced. Therefore, usually the RAID control section 411 can complete a setting change process normally. However, for example, if a RAID level is changed from "6" or "5" to "1," the number of drives needed increases. Therefore, the RAID control section 411 cannot complete a setting change process, depending on the number of drives connected.

If there is a RAID level which is not supported after the revision process, then the screen extraction section 415 extracts screen information 600 for displaying RAID level setting data (step S16 of FIG. 18). At this time the screen information 600 extracted includes screen information 600 for displaying a RAID level setting screen. In addition, for example, if a plurality of RAID groups are set, then the number of pieces of screen information 600 for displaying a RAID level setting screen which are extracted corresponds to that of the plurality of RAID groups.

Out of the pieces of screen information 600 for displaying a RAID level setting screen which are extracted by the screen extraction section 415, the GUI processing section 431 selects a piece of screen information 600 corresponding to a RAID level setting screen for one RAID group and makes the Web browse processing section 311 of the management terminal 300 display the RAID level setting screen (step S31). In this case, it is assumed that, of pieces of screen information 600 for displaying a setting screen which are extracted by the screen extraction section 415, the highest priorities are assigned to the pieces of screen information 600 for displaying a RAID level setting screen.

If a RAID level set on the RAID level setting screen displayed is also supported after the revision process, then the manager clicks a Checked button on the RAID level setting screen without performing setting change operation (step S32).

If there is a RAID group which has not been checked yet, then the GUI processing section 431 makes the management terminal 300 display a RAID level setting screen for the RAID group (steps S33 and S31). For example, the same value may be assigned to pieces of screen information 600 corresponding to screens of the same kind, such as RAID level setting screens for RAID groups, as priorities for display. In this case, the pieces of screen information 600 should be selected in step S31 in, for example, ascending order of group number of RAID group set.

If a RAID level set on the RAID level setting screen displayed is not supported after the revision process, then the manager changes a RAID level value and performs operation for making a setting change request (step S32). The GUI processing section 431 makes the management terminal 300 display a screen which is indicative that a setting change process is being performed. At this time the RAID control section 411 performs a necessary process, such as copying or deleting data or changing the arrangement of volumes in a drive, according to a changed RAID level (step S34).

For example, if the setting change process cannot be completed normally because of a shortage of drives, then the RAID control section 411 informs the GUI processing section 431 of an error. In addition to this, increasing the number of the drives is recommended as work for completing the setting change process and the RAID control section 411 informs the GUI processing section 431 of the number of drives to be increased (step S35).

The GUI processing section 431 makes the management terminal 300 display an error notice screen on which information for recommending increasing the number of the drives, the number of drives to be increased, and the like are displayed (step S37). For example, the manager increases the number of the drives in accordance with the information displayed and performs setting operation so that the CM 110a can use the drives increased. The manager then performs operation which is indicative that the work is completed (steps S40 and S41).

In this case, the RAID level setting screen is displayed again on the management terminal 300 (step S42) and the manager performs operation again for changing the RAID level (step S32). The RAID control section 411 normally completes the setting change process for changing the RAID level (step S34) and outputs notice that the process is completed to the GUI processing section 431 (step S36). After that, if there is a RAID group which has not been checked yet, then the GUI processing section 431 makes the management terminal 300 display a RAID level setting screen for the RAID group (steps S33 and S31).

Furthermore, if the manager who sees the error notice screen in step S37 does not increase the number of the drives, then the manager may click the Terminate button on the error notice screen. By doing so, the revision process can be terminated (steps S38 and S39). As a result, the RAID firmware revision process is not continued in a state in which a necessary setting change process is not completed normally by the RAID control section 411.

In the above description a setting change process performed by the use of a RAID level setting screen is taken as an example. However, a setting change process using an encryption function setting screen, a copy area expansion function setting screen, or the like can also be performed in accordance with the procedure illustrated in FIG. 27.

Third Embodiment

In the above second embodiment the RAID firmware revision process and the revision work help process are performed in the RAID device. However, these processes may be performed in a device outside the RAID device in which the RAID firmware is executed. For example, these processes may be performed in a management terminal.

Figure 28:
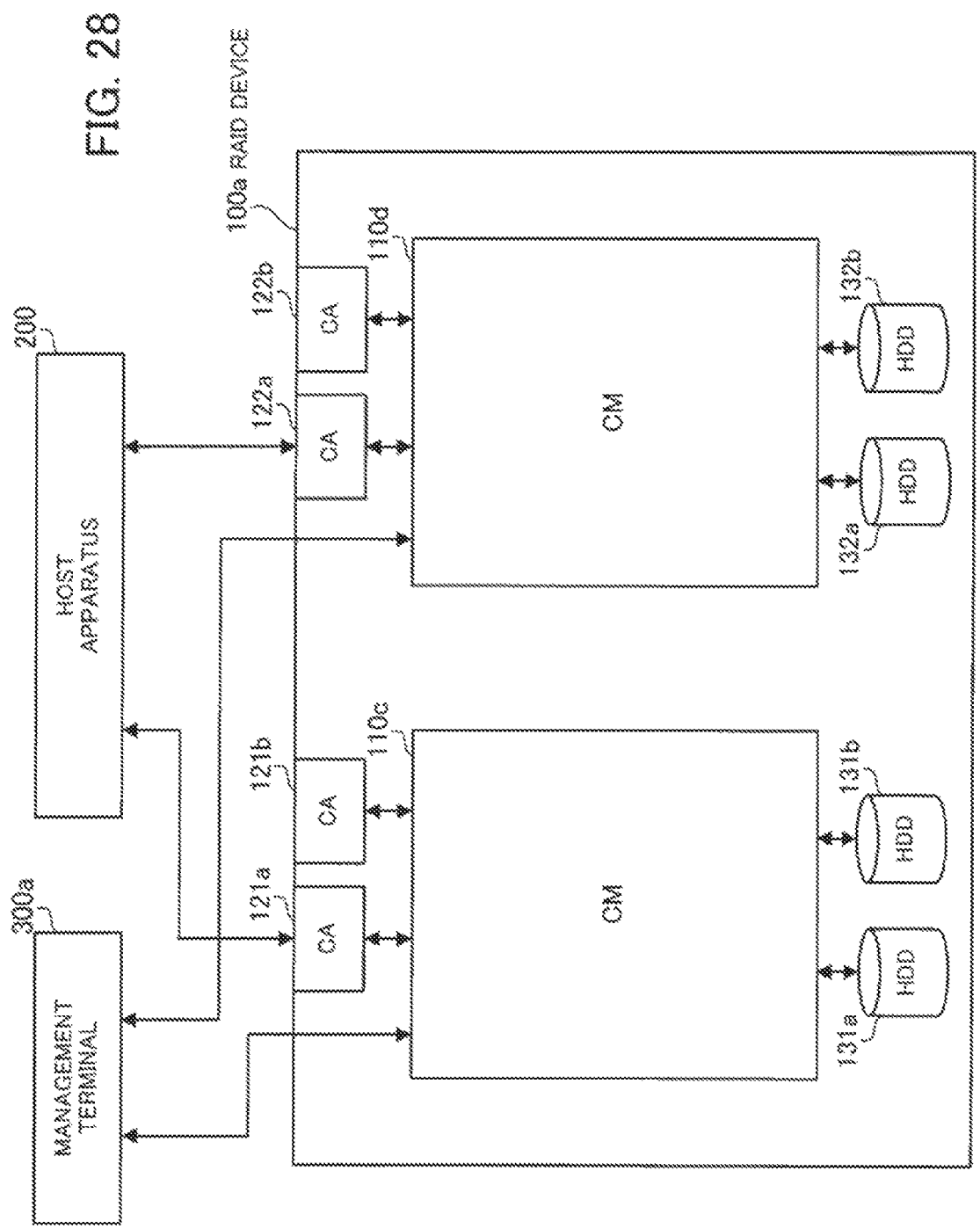
FIG. 28 illustrates the structure of a system according to a third embodiment.

FIG. 28 illustrates the structure of a system according to a third embodiment. Components in FIG. 28 corresponding to those in FIG. 2 are marked with the same numerals.

The basic structure of a storage control system according to this embodiment is the same as that of the system according to the second embodiment illustrated in FIG. 2. A RAID device 100a and a management terminal 300a illustrated in FIG. 28 correspond to the RAID device 100 and the management terminal 300, respectively, illustrated in FIG. 2. The hardware configuration of the RAID device 100a is the same as that of the RAID device 100 illustrated in FIG. 2. CMs 110c and 110d included in the RAID device 100a correspond to the CMs 110a and 110b, respectively, included in the RAID device 100. In addition, the hardware configuration of the management terminal 300a is the same as that of the management terminal 300 illustrated in FIG. 3.

In this embodiment, however, processes performed in accordance with programs in the CMs 110c and 110d and the management terminal 300a differ from those performed in accordance with the programs in the CMs 110a and 110b and the management terminal 300. In this embodiment a RAID firmware revision process and a revision work help process are performed not in the CMs 110c and 110d but in the management terminal 300a.

The processes performed in the CMs 110c and 110d of the RAID device 100a and the management terminal 300a will now be described. The CMs 110c and 110d can perform the same processes, so only processes performed by the CM 110c will be described.

Figure 29:
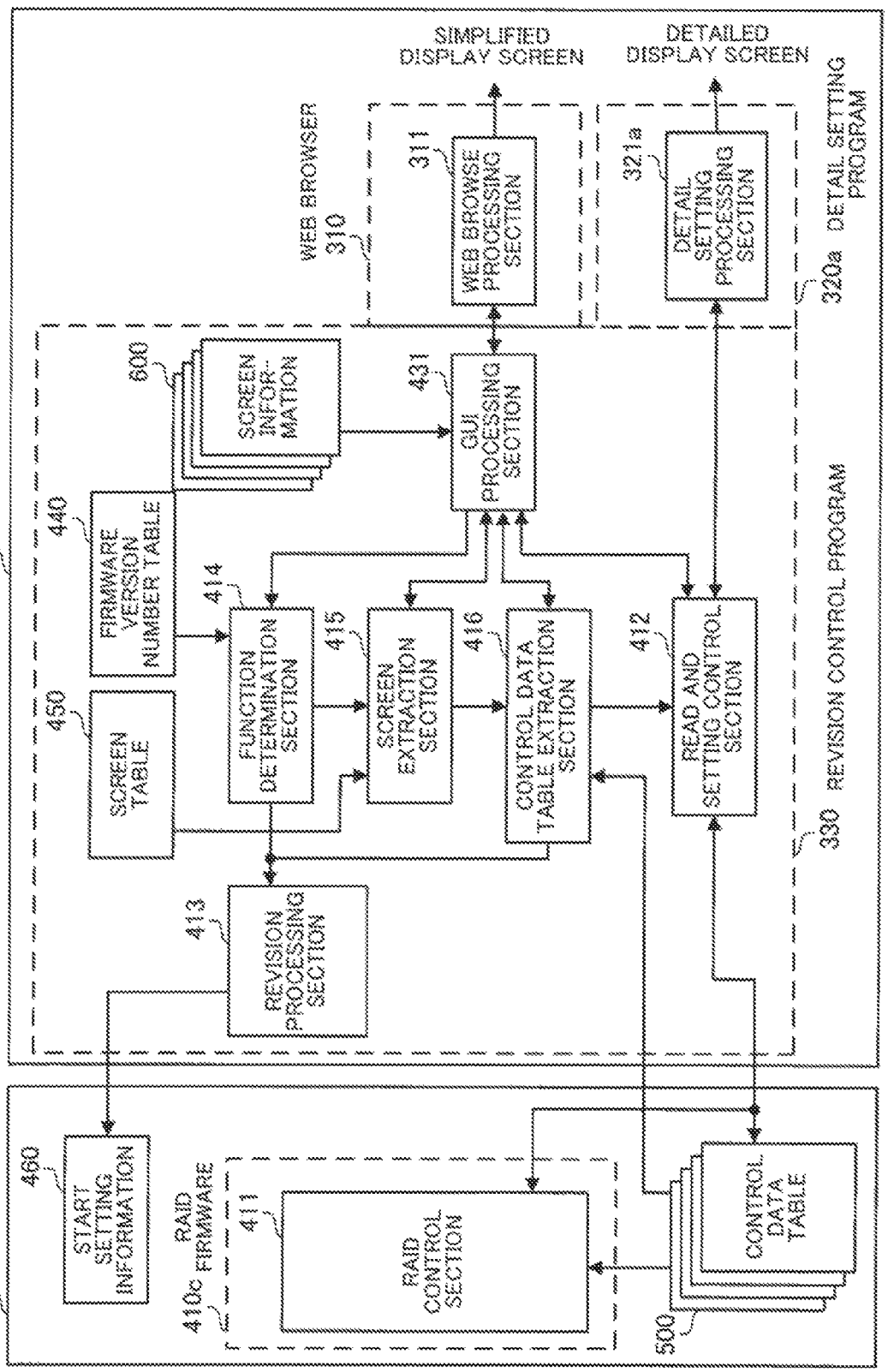
FIG. 29 is a block diagram of the functions of a CM and a management terminal included in the system according to the third embodiment.

FIG. 29 is a block diagram of the functions of the CM and the management terminal included in the system according to the third embodiment. Components in FIG. 29 corresponding to those illustrated in FIGS. 5 and 6 are marked with the same numerals.

In the CM 110c a RAID control section 411 performs a process in accordance with RAID firmware 410c for controlling a storage area by RAID. In addition, control data tables 500 referred to by the RAID control section 411 and start setting information 460 used at starting time are held in a flash ROM 113 included in the CM 110c. This is the same with the second embodiment.

On the other hand, the management terminal 300a includes a Web browse processing section 311, a detail setting processing section 321a, a read and setting control section 412, a revision processing section 413, a GUI processing section 431, a function determination section 414, a screen extraction section 415, and a control data table extraction section 416. Furthermore, screen information 600, a firmware version number table 440, and a screen table 450 are held in a non-volatile storage area (HDD 303, for example) included in the management terminal 300a.

The Web browse processing section 311 performs a process in accordance with a Web browser 310. This is the same with the second embodiment. However, the Web browse processing section 311 exchanges information with the GUI processing section 431 directly and not via a LAN.

The detail setting processing section 321a performs a process in accordance with a detail setting program 320a. The process performed by the detail setting processing section 321a is the same as that performed by the detail setting processing section 321 in the second embodiment. However, the detail setting processing section 321a exchanges information with the read and setting control section 412 directly and not via a detail setting interface section 432.

The read and setting control section 412, the revision processing section 413, the GUI processing section 431, the function determination section 414, the screen extraction section 415, and the control data table extraction section 416 perform processes in accordance with a revision control program 330. Each of these processing blocks performs the same process that is performed by a corresponding processing block in the second embodiment. However, the revision processing section 413 updates the start setting information 460 via a LAN and the read and setting control section 412 accesses the control data tables 500 via a LAN. In addition, the GUI processing section 431 and the read and setting control section 412 exchange information with the Web browse processing section 311 and the detail setting processing section 321a, respectively, directly and not via LANs.

In the above third embodiment the management terminal 300a performs processes. By doing so, the same RAID firmware revision process and revision work help process that are performed in the second embodiment are realized. Accordingly, efficiency in revision work is enhanced.

A process performed by at least one of the read and setting control section 412, the revision processing section 413, the function determination section 414, the screen extraction section 415, and the control data table extraction section 416 included in the management terminal 300a may be performed in the CM 110c. Furthermore, a process by at least one of the above processing blocks may be realized in the CM 110c by sending a determined program from the management terminal 300a to the CM 110c and executing the program sent in the CM 110c.

At least part of the function of each device described in each of the above embodiments can be realized with a computer. In this case, a program in which the contents of the function are described is provided. By executing this program on the computer, the above function is realized on the computer. This program can be recorded on a computer readable record medium. A computer readable record medium can be a magnetic storage device, an optical disk, a magneto-optical recording medium, a semiconductor memory, or the like.

To place the program on the market, portable record media, such as optical disks, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

According to the above information processing apparatus, information processing program, and information processing method, efficiency in work for changing a program to be executed from the first program to the second program can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. An information processing apparatus comprising:
a processor configured to perform a procedure including:
determining, of processing functions realized by a first program, a differential processing function that is not realized at the time of a second program being executed in place of the first program; and
determining a control information group including a piece of control information related to the differential processing function on the basis of a plurality of pieces of relation information stored in a storage section, wherein
the pieces of relation information are associated with respective control information groups each including one or more pieces of control information and are used for identifying a processing function related to at least one piece of control information included in the respective control information groups, and
each of the control information groups includes at least one piece of control information used at the time of executing the first program.
2. The information processing apparatus according to claim 1, wherein:
each of the pieces of relation information is associated with a different control information display screen on which one or more pieces of control information are displayed, and is used for identifying a processing function related to at least one piece of control information displayed on a control information display screen; and the determining a control information group determines a control information display screen on which the piece of control information related to the differential processing function is displayed by the use of the relation information.

3. The information processing apparatus according to claim 2, wherein the procedure further includes making a request, at the time of the control information display screen on which the piece of control information related to the differential processing function is displayed being determined, to display information for prompting a reader to see the control information display screen determined.

4. The information processing apparatus according to claim 2, wherein at least one of a plurality of control information display screens is an operation screen for accepting a change in control information displayed.

5. The information processing apparatus according to claim 1, wherein the procedure further includes making a request, at the time of the control information group including the piece of control information related to the differential processing function being determined, to display a list display screen on which the control information group determined is displayed.

6. The information processing apparatus according to claim 1, wherein:
the first program and the second program are programs for controlling a storage unit; and
the determining a differential processing function is performed when a program change process for changing a program executed on a storage controller for controlling the storage unit from the first program to the second program is begun.

7. A computer-readable, non-transitory medium storing an information processing program causing a computer to perform:
determining, of processing functions realized by a first program, a differential processing function that is not realized at the time of a second program being executed in place of the first program when a program change process for changing a program executed on a storage controller for controlling a storage unit from the first program to the second program is begun, the first program and the second program being programs for controlling the storage unit; and
determining a control information display screen on which a piece of control information related to the differential processing function is displayed on the basis of a plurality of pieces of relation information stored in a storage section, wherein
each of the pieces of relation information is associated with a different control information display screen on which one or more pieces of control information are displayed, and is used for identifying a processing function related to at least one piece of control information displayed on the control information display screen, and
at least one of a plurality of control information display screens is an operation screen for accepting a change in control information displayed, wherein
the information processing program further causes the computer to perform:
making a request, at the time of the operation screen on which the piece of control information related to the differential processing function is displayed being determined, to display information for prompting a reader to see the operation screen determined; and
informing the storage controller of the piece of control information changed in response to operation input provided at the time of the operation screen which the reader is prompted to see being displayed and requesting the storage controller to perform a setting change process corresponding to the piece of control information changed.

8. An information processing apparatus comprising:
a processor configured to perform a procedure including:
determining, of processing functions realized by a first program, a differential processing function that is not realized at the time of a second program being executed in place of the first program when a program change process for changing a program executed on a storage controller for controlling a storage unit from the first program to the second program is begun, the first program and the second program being programs for controlling the storage unit; and
determining a control information display screen on which a piece of control information related to the differential processing function is displayed on the basis of a plurality of pieces of relation information stored in a storage section, wherein
each of the pieces of relation information is associated with a different control information display screen on which one or more pieces of control information are displayed, and is used for identifying a processing function related to at least one piece of control information displayed on the control information display screen, and
at least one of a plurality of control information display screens is an operation screen for accepting a change in control information displayed, wherein
the procedure further includes:
making a request, at the time of the operation screen on which the piece of control information related to the differential processing function is displayed being determined, to display information for prompting a reader to see the operation screen determined; and
informing the storage controller of the piece of control information changed in response to operation input provided at the time of the operation screen which the reader is prompted to see being displayed and requesting the storage controller to perform a setting change process corresponding to the piece of control information changed.

9. The information processing apparatus according to claim 8, wherein the procedure further includes, when the storage controller informs the information processing apparatus of completion of the setting change process, making a request to display another determined operation screen on which the piece of control information related to the differential processing function is displayed by the use of the relation information.

10. An information processing method for causing an information processing apparatus to perform:
determining, of processing functions realized by a first program, a differential processing function that is not realized at the time of a second program being executed in place of the first program when a program change process for changing a program executed on a storage controller for controlling a storage unit from the first program to the second program is begun, the first program and the second program being programs for controlling the storage unit; and
determining a control information display screen on which a piece of control information related to the differential processing function is displayed on the basis of a plurality of pieces of relation information stored in a storage section, wherein each of the pieces of relation information is associated with a different control information display screen on which one or more pieces of control information are displayed, and is used for identifying a processing function related to at least one piece of control information displayed on the control information display screen, and at least one of a plurality of control information display screens is an operation screen for accepting a change in control information displayed, wherein the information processing method further causes the information processing apparatus to perform:

making a request, at the time of the operation screen on which the piece of control information related to the differential processing function is displayed being determined, to display information for prompting a reader to see the operation screen determined; and informing the storage controller of the piece of control information changed in response to operation input provided at the time of the operation screen which the reader is prompted to see being displayed and requesting the storage controller to perform a setting change process corresponding to the piece of control information changed.

11. An information processing apparatus comprising:

a processor configured to perform a procedure including:

determining, of processing functions realized by a first program, a differential processing function that is not realized at the time of a second program being executed in place of the first program on the basis of first information identifying the processing functions realized by the first program and second information identifying processing functions realized by the second program;

reading out relation information that associates a plurality of processing functions realized by at least the first program with one or more pieces of control information related to each of the plurality of processing functions from a storage section; and determining a piece of control information related to the differential processing function by the use of the relation information, wherein bits which make up a bit string included in the first information and bits which make up a bit string included in the second information are equal in number and a processing function is assigned to each bit;

each bit included in the first information indicates whether a processing function assigned thereto is realized by the first program; and each bit included in the second information indicates whether a processing function assigned thereto is realized by the second program.

12. The information processing apparatus according to claim 11, wherein the determining a differential processing function performs a bitwise logical operation between the bit string included in the first information and the bit string included in the second information and determines the differential processing function on the basis of a bit string obtained as operation results.

13. The information processing apparatus according to claim 11, wherein:

the relation information includes a bit string which is stored in the storage section according to control information group including one or more pieces of control information and which is equal in bit number to the bit strings included in the first information and the second information, and a processing function is assigned to each bit of the bit string included in the relation information in a same order as assignment of a processing function to each bit of the bit strings included in the first information and the second information; and each bit of the bit string included in the relation information indicates whether at least one piece of control information included in a control information group is related to a processing function assigned thereto.

14. The information processing apparatus according to claim 13, wherein the determining a piece of control information:

compares a bit string obtained as results of a bitwise logical operation between the bit string included in the first information and the bit string included in the second information with the bit string included in the relation information; and determines on the basis of a comparison result whether at least one piece of control information included in a control information group corresponding to the relation information is related to the differential processing function.

15. A computer-readable, non-transitory medium storing an information processing program causing a computer to perform:

determining, of processing functions realized by a first program, a differential processing function that is not realized at the time of a second program being executed in place of the first program; and determining a control information group including a piece of control information related to the differential processing function on the basis of a plurality of pieces of relation information stored in a storage section, wherein the pieces of relation information are associated with respective control information groups each including one or more pieces of control information and are used for identifying a processing function related to at least one piece of control information included in the respective control information groups, and each of the control information groups includes at least one piece of control information used at the time of executing the first program.

16. An information processing method for causing an information processing apparatus to perform:

determining, of processing functions realized by a first program, a differential processing function that is not realized at the time of a second program being executed in place of the first program; and determining a control information group including a piece of control information related to the differential processing function on the basis of a plurality of pieces of relation information stored in a storage section, wherein the pieces of relation information are associated with respective control information groups each including one or more pieces of control information and are used for identifying a processing function related to at least one piece of control information included in the respective control information groups, and each of the control information groups includes at least one piece of control information used at the time of executing the first program.

17. An information processing method for causing an information processing apparatus to perform:

determining, of processing functions realized by a first program, a differential processing function that is not realized at the time of a second program being executed in place of the first program on the basis of first information identifying the processing functions realized by the first program and second information identifying processing functions realized by the second program;

reading out relation information that associates a plurality of processing functions realized by at least the first program with one or more pieces of control information related to each of the plurality of processing functions from a storage section; and determining a piece of control information related to the differential processing function by the use of the relation information, wherein bits which make up a bit string included in the first information and bits which make up a bit string included in the second information are equal in number and a processing function is assigned to each bit;

each bit included in the first information indicates whether a processing function assigned thereto is realized by the first program; and each bit included in the second information indicates whether a processing function assigned thereto is realized by the second program.

18. A computer-readable, non-transitory medium storing an information processing program causing a computer to perform:

determining, of processing functions realized by a first program, a differential processing function that is not realized at the time of a second program being executed in place of the first program on the basis of first information identifying the processing functions realized by the first program and second information identifying processing functions realized by the second program;

reading out relation information that associates a plurality of processing functions realized by at least the first program with one or more pieces of control information related to each of the plurality of processing functions from a storage section; and determining a piece of control information related to the differential processing function by the use of the relation information, wherein bits which make up a bit string included in the first information and bits which make up a bit string included in the second information are equal in number and a processing function is assigned to each bit;

each bit included in the first information indicates whether a processing function assigned thereto is realized by the first program; and each bit included in the second information indicates whether a processing function assigned thereto is realized by the second program.

* * * * *